(12) United States Patent
Cherkasova

(10) Patent No.: US 7,349,906 B2
(45) Date of Patent: Mar. 25, 2008

(54) SYSTEM AND METHOD HAVING IMPROVED EFFICIENCY FOR DISTRIBUTING A FILE AMONG A PLURALITY OF RECIPIENTS

(75) Inventor: Ludmila Cherkasova, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 852 days.

(21) Appl. No.: 10/619,805

(22) Filed: Jul. 15, 2003

(65) Prior Publication Data

US 2005/0015404 A1    Jan. 20, 2005

(51) Int. Cl.
G06F 7/00 (2006.01)
G06F 17/30 (2006.01)
G06F 17/00 (2006.01)
G06F 12/00 (2006.01)
G06F 15/16 (2006.01)

(52) U.S. Cl. .................. 707/10; 707/104.1; 707/205; 709/219

(58) Field of Classification Search ............. 709/219, 709/231; 707/10, 104.1, 205
See application file for complete search history.

(56) References Cited

U.S. PATENT DOCUMENTS

| | | | | |
|---|---|---|---|---|
| 5,928,331 | A * | 7/1999 | Bushmitch | 709/231 |
| 5,963,944 | A * | 10/1999 | Adams | 707/10 |
| 6,205,445 | B1 | 3/2001 | Tokuyama | |
| 6,212,166 | B1 * | 4/2001 | Akiyama et al. | 370/236 |
| 6,230,251 | B1 | 5/2001 | Batten et al. | |
| 6,233,252 | B1 * | 5/2001 | Barker et al. | 370/473 |
| 6,253,185 | B1 | 6/2001 | Arean et al. | |
| 6,269,080 | B1 * | 7/2001 | Kumar | 370/236 |
| 6,330,370 | B2 | 12/2001 | Goyal et al. | |
| 6,345,125 | B2 | 2/2002 | Goyal et al. | |
| 6,397,251 | B1 | 5/2002 | Graf | |
| 6,405,219 | B2 * | 6/2002 | Saether et al. | 707/201 |
| 6,449,688 | B1 | 9/2002 | Peters et al. | |
| 6,460,153 | B1 | 10/2002 | Chou et al. | |
| 6,477,583 | B1 * | 11/2002 | Zayas et al. | 709/248 |
| 6,493,877 | B1 | 12/2002 | Yamazaki et al. | |
| 6,516,297 | B1 | 2/2003 | Servetto et al. | |
| 2001/0040871 | A1 | 11/2001 | Abrahamsson et al. | |
| 2002/0083118 | A1 | 6/2002 | Sim | |
| 2002/0083187 | A1 | 6/2002 | Sim et al. | |

(Continued)

OTHER PUBLICATIONS

Blanton, Microsoft Computer Dictionary, 2002, Microsoft Press, Fifth Edition, p. 397 and p. 499.*

(Continued)

*Primary Examiner*—Apu Mofiz
*Assistant Examiner*—Brent S Stace

(57) ABSTRACT

Systems and methods for efficiently distributing a file from a first node to a plurality of recipient nodes are provided. A method comprises distributing a plurality of subfiles that comprise a file from a first node to a first group comprising a plurality of recipient nodes, wherein at least one subfile distributed from the first node to each recipient node of the first group but no individual recipient node receives all of the plurality of subfiles from the first node. The method further comprises exchanging subfiles among the plurality of recipient nodes of the first group, wherein at least one recipient node of the first group begins communicating a portion of the subfile that it is receiving from the first node to at least one other recipient node before the at least one recipient node fully receives the subfile.

34 Claims, 8 Drawing Sheets

U.S. PATENT DOCUMENTS

2002/0133491 A1* 9/2002 Sim et al. .................... 707/10
2003/0007515 A1   1/2003 Apostolopoulos et al.
2003/0009535 A1   1/2003 Apostolopoulos et al.
2003/0009578 A1   1/2003 Apostolopoulos et al.
2004/0088380 A1* 5/2004 Chung et al. ............... 709/219

OTHER PUBLICATIONS

Pickett, The American Heritage College Dictionary, 2002, Houghton Mifflin Company, Fourth Edition, p. 1366.*

Byers, John et al., "Informed Content Delivery Across Adaptive Overlay Networks", Proc. of ACM SIGCOMM, 2002, pp. 1-14.
U.S. Appl. No. 10/345,587, Cherkasova.
U.S. Appl. No. 10/345,716, Cherkasova.
U.S. Appl. No. 10/345,718, Cherkasova.
U.S. Appl. No. 10/345,719, Cherkasova.
U.S. Appl. No. 10/429,797, Cherkasova.
U.S. Appl. No. 10/619,805, Cherkasova.

* cited by examiner

SYSTEM AND METHOD HAVING IMPROVED EFFICIENCY FOR DISTRIBUTING A FILE AMONG A PLURALITY OF RECIPIENTS

CROSS-REFERENCE TO RELATED APPLICATIONS

This application is related to co-pending and commonly assigned U.S. patent application Ser. No. 10/345,716, filed Jan. 16, 2003, titled "SYSTEM AND METHOD FOR EFFICIENTLY REPLICATING A FILE AMONG A PLURALITY OF RECIPIENTS", co-pending and commonly assigned U.S. patent application Ser. No. 10/345,587, filed Jan. 16, 2003, titled "SYSTEM AND METHOD FOR EFFICIENTLY REPLICATING A FILE AMONG A PLURALITY OF RECIPIENTS IN A RELIABLE MANNER", co-pending and commonly assigned U.S. patent application Ser. No. 10,345,718, filed Jan. 16, 2003, titled "SYSTEM AND METHOD FOR EFFICIENTLY REPLICATING A FILE AMONG A PLURALITY OF RECIPIENTS HAVING IMPROVED SCALABILITY", co-pending and commonly assigned U.S. patent application Ser. No. 10/345,719, filed Jan. 16, 2003, titled "SYSTEM AND METHOD FOR EFFICIENTLY REPLICATING A FILE AMONG A PLURALITY OF RECIPIENTS HAVING IMPROVED SCALABILITY AND RELIABILITY", and co-pending and commonly assigned U.S. patent application Ser. No. 10/429,797, filed May 5, 2003, titled "SYSTEM AND METHOD FOR EFFICIENT REPLICATION OF FILES ENCODED WITH MULTIPLE DESCRIPTION CODING", the disclosures of which are hereby incorporated herein by reference.

FIELD OF THE INVENTION

The present invention relates in general to file distribution, and more specifically to systems and methods for efficiently distributing a file from a first node to a plurality of recipient nodes.

DESCRIPTION OF RELATED ART

Today, much information is stored as digital data. Such information is often available to processor-based devices via client-server networks. Client-server networks are delivering a large array of information (including content and services) such as news, entertainment, personal shopping, airline reservations, rental car reservations, hotel reservations, on-line auctions, on-line banking, stock market trading, as well as many other services and types of content. Such information providers (sometimes referred to as "content providers") are making an ever-increasing amount of information available to users via client-server networks.

It is often desirable to communicate information to a plurality of different recipients. More particularly, it is often desirable to replicate a large file among a number of distributed computers. For instance, in some situations it is desirable for a plurality of distributed clients to receive a replicated file. For example, suppose a number of client computers comprise a software application program and the application program's provider makes a modification or update to the program. The application provider may desire to distribute the software update to each of the client computers. As another example, a company may receive a new software program and desire to distribute the software program to all of its computers that are communicatively coupled to the company's Local Area Network (LAN) or Intranet.

As still another example, it may be desirable for a large file to be replicated among a plurality of distributed servers. For instance, as described further below, a plurality of distributed servers may be established for efficiently serving content to clients (e.g., each server may be responsible for a particular geographical region of clients), and it may be desirable to replicate a file from an originating server to the other distributed servers such that all of the servers provide the same content to their respective clients. For example, Content Delivery Networks (CDNs) are based on a large-scale distributed network of servers located closer to the edges of the Internet for efficient delivery of digital content, including various forms of multimedia content. The main goal of the CDN's architecture is to minimize the network impact in the critical path of content delivery as well as to overcome a server overload problem, which is a serious threat for busy sites serving popular content. CDNs implementing distributed content servers are becoming increasingly popular on the Internet, and particularly within the World Wide Web (the "web") portion of the Internet, for example, for serving content (web documents) to clients. Many edge servers may be implemented within the Internet (e.g., hundreds, thousands, or even hundreds of thousands of edge servers may be implemented) that are each to serve the same, replicated content to their respective clients.

For many web documents (e.g., html pages and images having a relatively small file size) served via CDN, active replication of the original content at the edge servers may not be needed. The CDN's edge servers act as caching servers, and if the requested content is not yet in the cache at the time it is requested by a client, the content is retrieved from the original server using the so-called pull model. The performance penalty associated with the initial document retrieval from the original server to the edge server serving the requesting client, such as higher latency observed by the client and the additional load experienced by the original server, is generally not significant for small to medium size web documents.

For large files (e.g., large documents, software download packages, and media files), a different operational mode is typically preferred. In this case, it is typically desirable to replicate these files at edge servers in advance of a client requesting them, using the so-called push model. For large files, actively replicating the files to a plurality of distributed edge servers is a challenging, resource-intensive problem, e.g., streaming media files can require significant bandwidth and download time due to their large sizes: a 20 minute streaming media file encoded at 1 Mbit/s results in a file of 150 Mbytes. Thus, if such a large file was not actively replicated to the edge servers in advance of a client requesting the file, a significant performance penalty may be incurred for retrieving the file from the original server, such as higher latency observed by the client and the additional load experienced by the original server in providing the large file to the edge server serving the requesting client. Sites supported for efficiency reasons by multiple mirror servers face a similar problem: the original content needs to be replicated across the multiple, geographically distributed, mirror servers.

BRIEF SUMMARY OF THE INVENTION

In certain embodiments of the present invention, a method of distributing a file from a first node to a plurality of recipient nodes is provided. The method comprises partitioning a file into a plurality of subfiles, and distributing the plurality of subfiles from a first node to a first group comprising a plurality of recipient nodes, wherein at least one subfile is distributed from the first node to each recipient node of the first group but no individual recipient node receives all of the plurality of subfiles from the first node. The method further comprises exchanging subfiles among the plurality of recipient nodes of the first group such that each recipient node of the first group obtains all of the plurality of subfiles, wherein at least one recipient node of the first group begins communicating a portion of its respective subfile that it is receiving from the first node to at least one other recipient node of the first group before the at least one recipient node fully receives its respective subfile.

In certain embodiments, a system comprises means for partitioning a file into a plurality of subfiles, and an origin node comprising means for distributing all of the plurality of subfiles from the origin node to a first group comprising a plurality of recipient nodes, wherein at least one subfile is distributed from the origin node to each recipient node of the first group but not all of the plurality of subfiles are distributed from the origin node to any of the recipient nodes of the first group. The recipient nodes of the first group each comprise means for exchanging their respective subfiles received from the origin node such that each recipient node of the first group obtains all of the plurality of subfiles, wherein the means for exchanging of at least one recipient node of the first group begins communicating a portion of its respective subfile that it is receiving from the first node to at least one other recipient node of the first group before the at least one recipient node fully receives its respective subfile from the first node.

In certain embodiments, a system comprises an origin node operable to partition a file into a plurality of subfiles, wherein the plurality of subfiles correspond in number to a number of recipient nodes in a first group to which the file is to be distributed. The origin node is operable to distribute all of the plurality of subfiles to the recipient nodes, wherein a different subfile is distributed from the origin node to each of the recipient nodes. The recipient nodes are operable to exchange their respective subfiles received from the origin node such that each recipient node obtains all of the plurality of subfiles, wherein at least one recipient node is operable to begin communicating a portion of its respective subfile that it is receiving from the origin node to at least one other recipient node before the at least one recipient node fully receives its respective subfile from the origin node.

In certain embodiments, a method of distributing a file from a first node to a plurality of recipient nodes is provided. The method comprises distributing a plurality of subfiles that comprise a file from a first node to a first group comprising a plurality of recipient nodes, wherein at least one subfile distributed from the first node to each recipient node of the first group but no individual recipient node of said first group receives all of the plurality of subfiles from the first node. The method further comprises exchanging subfiles among the plurality of recipient nodes of the first group such that each recipient node of the first group obtains all of the plurality of subfiles, wherein at least one recipient node of the first group begins communicating a portion of its respective subfile that it is receiving from the first node to at least one other recipient node of the first group before the at least one recipient node fully receives its respective subfile.

In certain embodiments, a method of distributing from a first node to a plurality of recipient nodes a file encoded with multiple description coding is provided. The method comprises distributing a plurality of descriptors of a file encoded with multiple description coding (MDC) from a first node to a first group comprising a plurality of recipient nodes, wherein at least one descriptor is distributed from the first node to each recipient node of the first group but not all of said plurality of descriptors are distributed from the first node to any of the recipient nodes of the first group. The method further comprises the plurality of recipient nodes of the first group exchanging their respective descriptors such that each recipient node of the first group obtains all of the plurality of descriptors, wherein at least one recipient node of the first group begins communicating a portion of its respective descriptor that it is receiving from the first node to at least one other recipient node of the first group before the at least one recipient node fully receives its respective descriptor from the first node.

DETAILED DESCRIPTION

Figure 1:
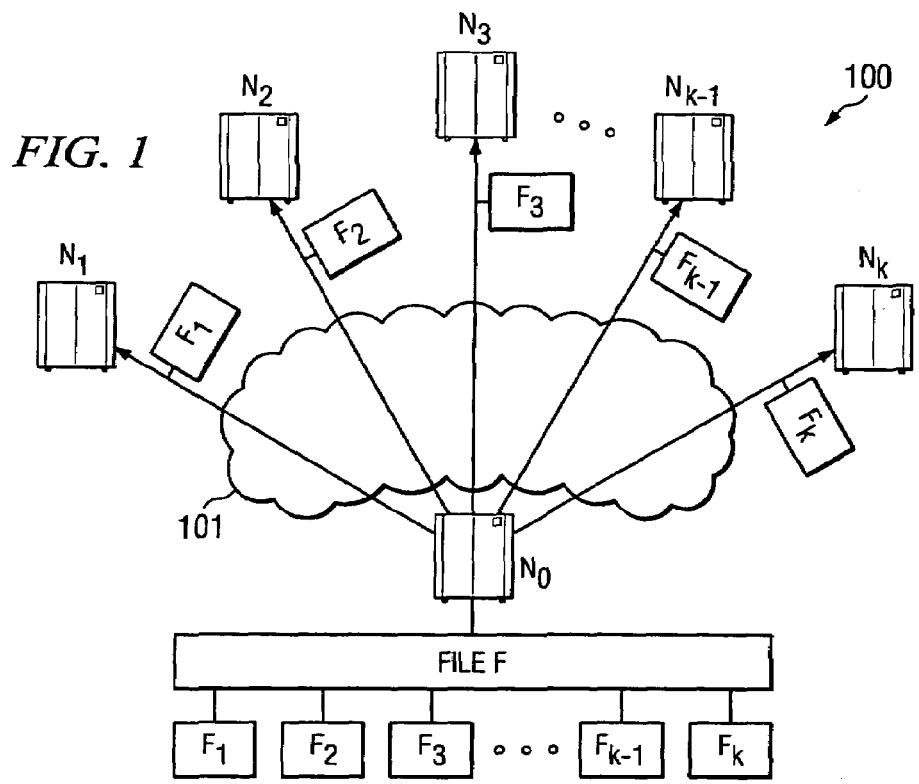
FIG. 1 shows an example environment in which embodiments of the present invention may be utilized and illustrates an example of distributing subfiles from an origin node to a plurality of recipient nodes in accordance with a file distribution technique of an embodiment of the present invention.

Various embodiments of the present invention are now described with reference to the above figures, wherein like reference numerals represent like parts throughout the several views. As described further below, embodiments of the present invention provide a system and method for distributing a file from a first node (which may be referred to herein as the "origin" node) to a plurality of recipient nodes. In certain embodiments, the plurality of recipient nodes comprise servers, such as edge servers in a CDN or mirror servers as examples. Of course, embodiments of the present invention may also be utilized for distributing a file to client nodes.

According to an embodiment of the present invention, a file distribution technique is provided that is scalable for application in distributing a file to a very large number of recipient nodes. For instance, embodiments of the present invention enable the recipient nodes to be logically organized into a plurality of different groups, with each group having a plurality of recipient nodes, and a file is efficiently distributed to the plurality of groups of recipient nodes.

According to certain embodiments, a file is partitioned into a plurality of parts (or "subfiles"), and the plurality of parts are distributed from the origin node to the recipient nodes. More particularly, all of the subfiles comprising the file to be distributed are communicated from an origin node to the recipient nodes, but the origin node does not send all of the subfiles to each recipient node. That is, the origin node sends only a portion of the subfiles that comprise the file to be distributed to each recipient node. For instance, in one embodiment, each recipient node receives a different one of the subfiles of the file to be distributed.

Further, the recipients exchange their respective subfiles with each other, thus resulting in each recipient obtaining the full file. More specifically, in accordance with embodiments of the present invention, at least one of the recipient nodes begins communicating its respective subfile that it is receiving from the origin node to other recipient nodes before the at least one recipient node receives the full subfile from the origin node. In certain embodiments, the nodes may exchange their respective subfiles in a manner such that they each begin to communicate a portion of their respective subfiles to the other recipient nodes before the full subfile is received from the origin node. Thus, in accordance with embodiments of the present invention, the recipient nodes may begin communicating portion(s) (e.g., packets) of their respective subfiles to other recipient nodes before their respective subfile is fully received from the origin node.

In view of the above, certain embodiments of the present invention provide a distribution technique in which the origin node is not required to communicate the full file to each recipient node, but rather may communicate only a portion thereof to each recipient node, and the recipient nodes exchange their respective portions to result in each recipient node obtaining all subfiles comprising the full file. Further, the recipient nodes may begin communicating portion(s) (e.g., packets) of their respective subfiles to other recipient nodes before their respective subfiles are fully received from the origin node. That is, the exchange of subfiles between the recipient nodes may be performed concurrently with the communication of the respective subfiles from the origin node to the recipient nodes. Accordingly, an efficient distribution of the file among the plurality of nodes is enabled.

Various techniques may be implemented for distributing a file from an origin node to a plurality of recipient nodes in accordance with embodiments of the present invention. Certain embodiments of the present invention implement a technique referred to herein as the Application-Level Multicast (ALM)-FastReplica distribution technique. With ALM-FastReplica, to replicate a large file F among a total of n recipient nodes, the recipient nodes may be logically grouped into "replication groups" that each have k nodes (or that each have no more than k nodes). As described further below, the value of k may be determined as a function of the maximum number of concurrent communication connections that each node to which the file F is to be distributed can support. The original file F may be partitioned into k subfiles of approximately equal size, and each subfile is communicated from the origin node to a different recipient node of a first replication group. That is, the subfiles are communicated to the recipient nodes of a first replication group from the origin node concurrently. Such communication of the subfiles from the origin node to the recipient nodes is referred to herein as a "distribution" step.

Further, each recipient node propagates its respective subfile (i.e., the subfile that it receives from the origin node) to the remaining recipient nodes of its respective replication group. That is, each recipient node concurrently communicates its subfile to the other nodes of the replication group. This exchange of sub files by recipient nodes is referred to herein as a "collection" step, as the recipient nodes of a replication group each collect the subfiles comprising file F from the other recipient nodes of the replication group. In accordance with embodiments of the present invention, the recipient nodes may begin communicating portion(s) of their respective subfiles to other recipient nodes before the entire subfile is received from the origin node. For instance, a first recipient node may receive a first subfile $F_1$ of file F from an origin node, and such first recipient node may communicate the first subfile $F_1$ to other recipient nodes of its respective replication group. Such first recipient node may begin communicating the first subfile $F_1$ to other recipient nodes of its respective replication group before the first recipient node receives all of the first subfile $F_1$ from the origin node. For example, while the first recipient node has a communication connection established with the origin node, through which the first recipient node is receiving packets of subfile $F_1$, the first recipient node may establish concurrent communication connections to the other recipient nodes of its respective replication group and begin communicating the received packets of subfile $F_1$ to the other recipient nodes before all packets of subfile $F_1$ are received by the first recipient node. In certain embodiments, the first recipient node may forward the packets of subfile $F_1$ to the other nodes of its replication group as the packets are received by the first recipient node from the origin node. Thus, the above-described distribution and collection steps may effectively be performed concurrently in certain embodiments of the present invention. Additionally, as described further below, if there is more than one replication group, the file may be further communicated to other replication groups. In certain embodiments, a recipient node of a first replication group may begin communicating a subfile that it is receiving from an origin node to a recipient node of a second replication group before the recipient node of the first replication group receives the full subfile from the origin node.

To better appreciate aspects of embodiments of the present invention, it is appropriate to briefly review the existing techniques in the art for file distribution. Currently, the three most popular methods used for content distribution (or file "replication") in the Internet environment are: (1) satellite distribution, (2) multicast distribution, and (3) application-level multicast distribution.

With satellite distribution, the content distribution server (or the "origin node") has a transmitting antenna. The servers (or "recipient nodes") to which the content should be replicated (or the corresponding Internet Data centers, where the servers are located) have a satellite receiving dish. The original content distribution server broadcasts a file via a satellite channel. Among the shortcomings of the satellite distribution method are that it requires special hardware deployment and the supporting infrastructure (or service) is quite expensive.

With multicast distribution, such as "IP Multicast" distribution, an application can send one copy of each packet of a file and address it to the group of recipient nodes (IP addresses) that want to receive it. This technique reduces network traffic by simultaneously delivering a single stream of information to hundreds/thousands of interested recipients. Multicast can be implemented at both the data-link layer and the network layer. Applications that take advantage of multicast technologies include video conferencing, corporate communications, distance learning, and distribution of software, stock quotes, and news. Among the shortcomings of the multicast distribution method is that it requires a multicast support in routers, which still is not consistently available across the Internet infrastructure.

Since the native IP multicast has not received widespread deployment, many industrial and research efforts have shifted to investigating and deploying "application-level multicast," where nodes across the Internet act as intermediate routers to efficiently distribute content along a predefined mesh or tree. A growing number of researchers have advocated this alternative approach, where all multicast related functionality, including group management and packet replication, is implemented at end systems. In this architecture, nodes participating in the multicast group self-organize themselves into a scalable overlay structure using a distributed protocol. Further, the nodes attempt to optimize the efficiency of the overlay by adapting to changing network conditions and considering the application-level requirements.

An extension for the end-system multicast is introduced by J. Byers, J. Considine, and M. Mitzenmacher in "Informed Content Delivery Across Adaptive Overlay Networks", *Proc. Of ACM SIGCOMM,* 2002, in which instead of using the end systems as routers forwarding the packets, the authors propose that the end-systems actively collaborate in an informed manner to improve the performance of large file distribution. The main idea is to overcome the limitation of the traditional service models based on tree topologies where the transfer rate to the client is defined by the bandwidth of the bottleneck link of the communication path from the origin server. The authors propose to use additional cross-connections between the end-systems to exchange the complementary content these nodes have already received. Assuming that any given pair of end-systems has not received exactly the same content, these cross-connections between the end-systems can be used to "reconcile" the differences in received content in order to reduce the total transfer time.

As mentioned above, certain embodiments of the present invention may implement a distribution technique referred to herein as the ALM-FastReplica distribution technique. As with the above-described application-level multicast approaches proposed in the existing art, implementations of such ALM-FastReplica distribution technique use the end nodes for packet replication. In accordance with embodiments of the present invention, the ALM-FastReplica distribution technique provides a technique for efficiently distributing a file among a plurality of nodes (e.g., by distributing a file in a manner that efficiently utilizes communication paths available between the nodes). Example embodiments implementing such ALM-FastReplica technique are described further below.

Consider the following notations:
(a) Let $N_0$ be a node (which may be referred to as an "origin node" or "origin server") which has an original file F, and let Size(F) denote the size of file F in bytes; and
(b) Let $R=\{N_1, \ldots, N_n\}$ be a replication set of nodes (i.e., a set of recipient nodes to which the file F is to be distributed).

The problem becomes replicating file F across nodes $N_1, \ldots, N_n$, while minimizing the overall replication time.

In accordance with certain embodiments, let k be a function of the maximum number of concurrent connections that each node can support. As an example, in one embodiment described further below, k is equal to the maximum number of concurrent connections that each node can support (which is typically 30 or less). In another example embodiment described further below, k+1 is the maximum number of concurrent connections that each node can support. In a further example embodiment described below, k+2 is the maximum number of concurrent connections that each node can support. Thus, in certain embodiments, k may be a number of network connections chosen for concurrent transfers between a single node and multiple recipient nodes. If n>k, then the original set R of n nodes to which file F is to be distributed are partitioned into replication groups that each have k nodes. Further, file F is divided into k subsequent subfiles $\{F_1, \ldots, F_k\}$ that are each approximately of equal size.

In one implementation of this ALM-FastReplica technique, file F is divided into k equal subsequent subfiles: $F_1, \ldots, F_k$, where $$\text{Size}(F_i) = \frac{\text{Size}(F)}{k}$$

bytes for each i: $1 \leq i \leq k$. The ALM-FastReplica algorithm then performs a distribution step in which origin node $N_0$ opens k concurrent network connections to nodes $N_1, \ldots, N_k$ of a first replication group, and sends to each recipient node $N_i$ ($1 \leq i \leq k$) the following items:
(a) a distribution list of nodes $R=\{N_1, \ldots, N_k\}$ to which subfile $F_i$ is to be sent during the collection step (each node $N_i$ is itself excluded from its distribution list); and
(b) subfile $F_i$.

An example of this distribution step of the ALM-FastReplica algorithm is shown in FIG. 1. For instance, FIG. 1 shows an example environment 100 in which embodiments of the present invention may be utilized. Environment 100 comprises origin node $N_0$ and recipient nodes $N_1$, $N_2$, $N_3, \ldots, N_{k-1}, N_k$ that are communicatively coupled via communication network 101. Communication network 101 is preferably a packet-switched network, and in various implementations may comprise, as examples, the Internet or other Wide Area Network (WAN), an Intranet, Local Area Network (LAN), wireless network, Public (or private) Switched Telephony Network (PSTN), a combination of the above, or any other communications network now known or later developed within the networking arts that permits two or more computing devices to communicate with each other. In certain embodiments, nodes $N_0$-$N_k$ comprise server computers. For instance, nodes $N_1, \ldots, N_k$ may comprise edge servers in a CDN or mirror servers within a mirrored network. In other embodiments, nodes $N_0$-$N_k$ may comprise server and/or client computers. For example, node $N_0$ may comprise a server computer, and nodes $N_1, \ldots, N_k$ may comprise client computers to receive a file (e.g., software application file, etc.) from node $N_0$.

Origin node $N_0$ comprises file F stored thereto, and such file F is partitioned into k subfiles $F_1, F_2, F_3, \ldots, F_{k-1}, F_k$, wherein the sum of subfiles $F_1, F_2, F_3, \ldots, F_{k-1}, F_k$ comprises the total file F. As shown, the plurality of subfiles are distributed from origin node $N_0$ to the recipient nodes $N_1, \ldots, N_k$. More particularly, all of the k subfiles comprising file F are communicated from origin node $N_0$ to the recipient nodes $N_1, \ldots, N_k$, but origin node $N_0$ does not send all of the k subfiles to each recipient node. That is, origin node $N_0$ sends only a portion of the k subfiles to each recipient node. For instance, in this example, each recipient node receives a different one of the k subfiles from origin node $N_0$. More particularly, origin node $N_0$ communicates subfile $F_1$ to node $N_1$, subfile $F_2$ to node $N_2$, subfile $F_3$ to node $N_3, \ldots$, subfile $F_{k-1}$ to node $N_{k-1}$, and subfile $F_k$ to node $N_k$ via communication network 101. Additionally, in an embodiment of the present invention, origin node $N_0$ also sends a distribution list to each recipient node $N_1, \ldots, N_k$. The distribution list for each node identifies the other recipient nodes that such recipient node is to communicate the subfile that it receives from origin node $N_0$. For example, origin node $N_0$ may send to node $N_1$ a distribution list identifying nodes $N_2, \ldots, N_k$. Similarly, origin node $N_0$ may send to node $N_2$ a distribution list identifying nodes $N_1$, and $N_3, \ldots, N_k$, and so on.

Figure 2:
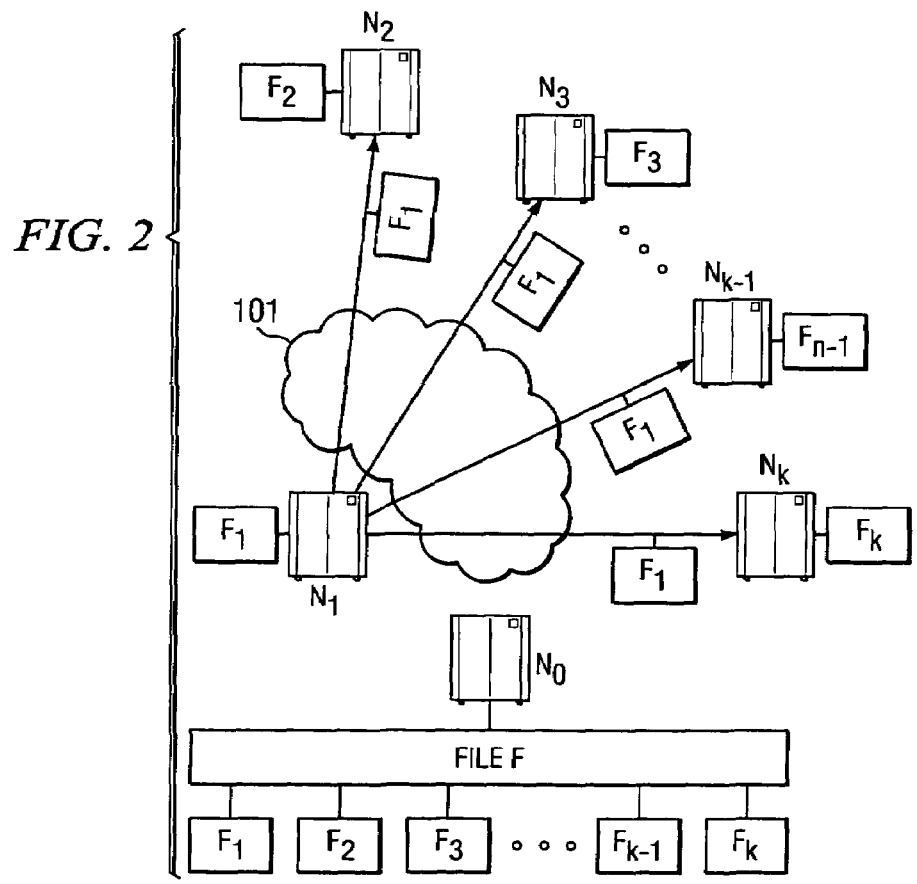
FIG. 2 shows an example of a recipient node communicating the subfile that it received from an origin node to other recipient nodes in accordance with the file distribution technique of FIG. 1.

The ALM-FastReplica algorithm also performs a collection step. An example of the collection step is described herein in conjunction with FIGS. 2 and 3. After receiving at least a portion of file $F_i$ (e.g., at least a first packet thereof), node $N_i$ opens (k−1) concurrent network connections to remaining nodes in the recipient group and sends the received portion of subfile $F_i$ to them, as shown in FIG. 2 for node $N_1$. More particularly, FIG. 2 shows that node $N_1$ opens k−1 concurrent network connections, i.e., one network connection with each of recipient nodes $N_2, \ldots, N_k$. Node $N_1$ communicates subfile $F_1$, which it receives from origin node $N_0$ in the above-described distribution step, to each of the recipient nodes $N_2, \ldots, N_k$. As described further below, node $N_1$ may begin communicating a portion of subfile $F_1$ to the other recipient nodes $N_2, \ldots, N_k$ before node $N_1$ receives all of subfile $F_1$ from origin node $N_0$. For instance, when implemented in a packet-switched network, node $N_1$ may begin communicating packets of subfile $F_1$ to the other recipient nodes $N_2, \ldots, N_k$ before node $N_1$ receives all packets of subfile $F_1$ from origin node $N_0$. In certain implementations, node $N_1$ may communicate packets of subfile $F_1$ to the other recipient nodes $N_2, \ldots, N_k$ as those packets are received by node $N_1$ from origin node $N_0$.

Figure 3:
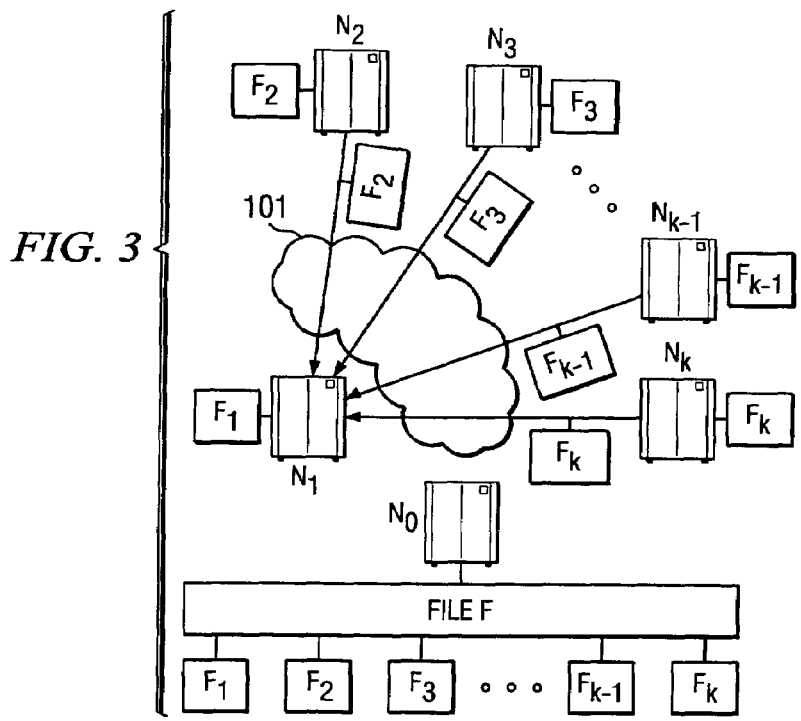
FIG. 3 shows an example of a recipient node receiving subfiles from each of the other recipient nodes in accordance with the file distribution technique of FIG. 1.

Similarly, FIG. 3 shows the set of incoming, concurrent connections to node $N_1$ from the remaining recipient nodes $N_2, \ldots, N_k$, transferring the complementary subfiles $F_2, \ldots, F_k$ during the collection step of the ALM-FastReplica algorithm. More particularly, FIG. 3 shows that node $N_1$ has k−1 concurrent network connections, i.e., one network connection with each of recipient nodes $N_2, \ldots, N_k$ through which node $N_1$ receives the other subfiles comprising file F from the recipient nodes $N_2, \ldots, N_k$. That is, each of recipient nodes $N_2, \ldots, N_k$ communicates its respective subfile that it receives from origin node $N_0$. As described further below, each of nodes $N_2, \ldots, N_k$ may begin communicating received portions of their respective subfiles $F_2, \ldots, F_k$ to the other recipient nodes (e.g., as shown with node $N_1$ in FIG. 3) before such nodes $N_2, \ldots, N_k$ receive all of their respective subfile from origin node $N_0$. Thus, the distribution step of FIG. 1 and the collection steps of FIGS. 2 and 3 may be effectively performed concurrently.

Accordingly, during the distribution and collection operations, each node $N_i$ may have the following set of network connections:

(a) there are k−1 outgoing connections from node $N_i$: one connection to each node $N_j$ (j≠i) of the replication group for sending the corresponding subfile $F_i$ to node $N_j$; and (b) there are k incoming connections to node $N_i$: one connection from each node $N_j$ (j≠i) of the replication group for sending the corresponding subfile $F_j$ to node $N_i$ in addition to the connection from origin node $N_0$ to node $N_i$ for sending subfile $F_i$ to node $N_i$.

Thus, at the end of the above distribution and collection operations, each recipient node receives all subfiles $F_1, \ldots, F_k$ comprising the entire original file F. Accordingly, each of the nodes in the first replication group obtain the full file F (which is reconstructed through the received subfiles). Additionally, if additional replication groups exist, the file may be further communicated to such additional replication groups (e.g., as described further below) such that the entire set R of recipient nodes n obtain the full file F. An example embodiment of the ALM-FastReplica distribution technique is described further below in conjunction with FIGS. 4-9C.

In accordance with an example embodiment, again let k be a number of network connections chosen for concurrent transfers between a single node and multiple recipient nodes. If the total number of nodes n to which file F is to be distributed is greater than k (i.e., n>k), then the original set R of n nodes are partitioned into replication groups that each have k nodes. Let $G_1, \ldots, G_{k_1}$ be the corresponding replication groups. Further, file F is divided into k subsequent subfiles $\{F_1, \ldots, F_k\}$ that are each approximately of equal size.

Figure 4:
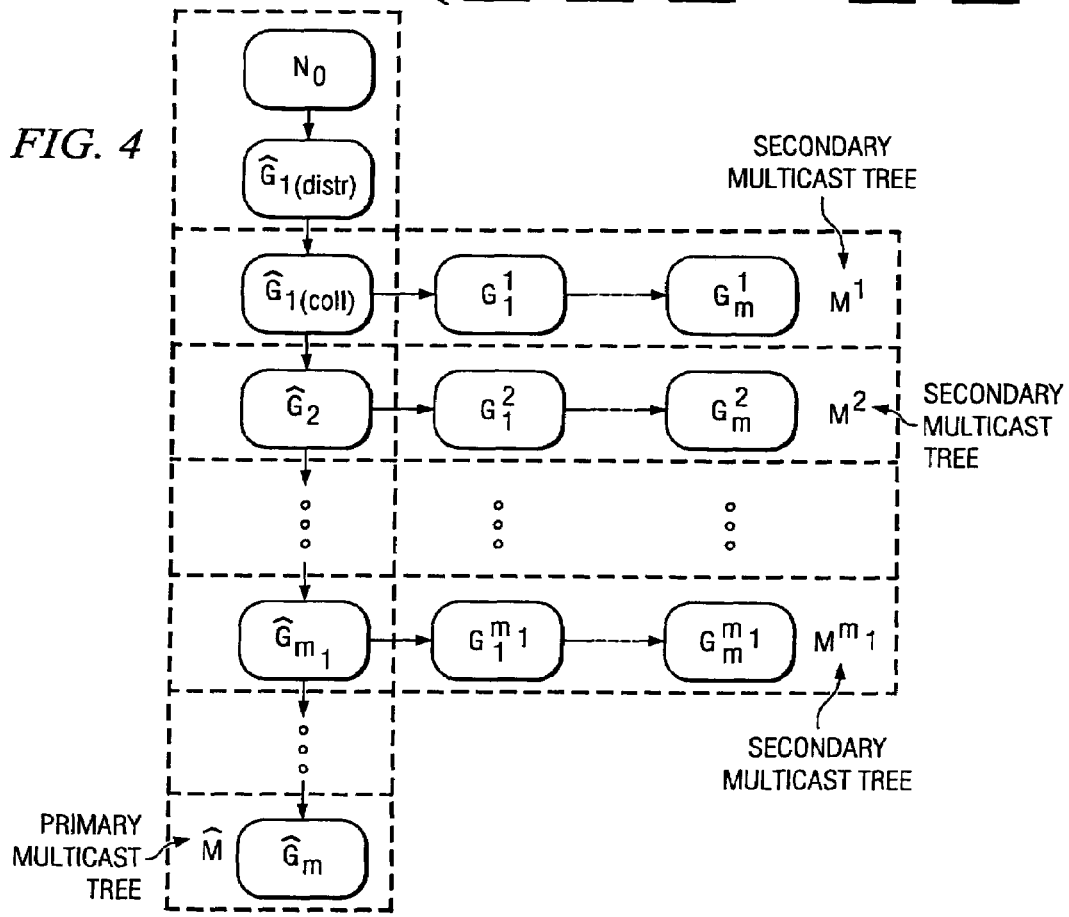
FIG. 4 shows an example of logically arranging a plurality of replication groups of recipient nodes into primary and secondary multicast trees in accordance with an embodiment of the present invention.

Let m be a number of groups comprising a multicast tree. According to previous studies (see e.g., Y. Chu, S. Rao, S. Seshan, H. Zhang, "Enabling conferencing applications on the Internet using an overlay multicast architecture", *Proc. of ACM SIGCOMM,* 2001), a reasonable value of m may vary in a range of several 10 s of nodes, for example. Then replication groups $G_1, \ldots, G_{k_1}$ may be arranged in the special multicast trees $\hat{M}, M^1, \ldots, M^{m_1}$ each having m (or less) groups, where $\hat{M}$ is referred to as a "primary" multicast tree, and $M^1, \ldots, M^{m_1}$ are referred to as "secondary" multicast trees. FIG. 4 shows an example of a plurality of replication groups $G_1, \ldots, G_{k_1}$ that are arranged in such multicast trees $\hat{M}, M^1, \ldots, M^{m_1}$.

A primary multicast tree, $\hat{M}$, comprises replication groups in which a portion of a subfile begins being communicated to at least one node thereof from a node of another replication group before the node of such other replication group fully receives the subfile. For instance, in the example of FIG. 4, primary multicast tree $\hat{M}$ comprises origin node $N_0$ and replication groups $\hat{G}_1, \hat{G}_2, \ldots, \hat{G}_m$. At least one recipient node of group $\hat{G}_1$ is operable to begin communicating its respective subfile that it is receiving from origin node $N_0$ to at least one recipient node of group $\hat{G}_2$ before such at least one node of group $\hat{G}_1$ receives the entire subfile from origin node $N_0$.

A secondary multicast tree, such as secondary multicast trees $M^1, \ldots, M^{m_1}$ of the example of FIG. 4, comprises at least one replication group in which a portion of a subfile begins being communicated to a node thereof from a node of another replication group after the node of such other replication group fully receives the subfile. For instance, in the example of FIG. 4, secondary multicast tree $M^1$ comprises replication groups $G_1^1, G_2^1, \ldots, G_m^1$. In this example, the recipient nodes of group $\hat{G}_1$ are operable to begin communicating their respective subfiles that they receive from origin node $N_0$ to at least one recipient node of group $G_1^1$ of secondary tree $M^1$ after such recipient nodes of group $\hat{G}_1$ fully receive their respective subfiles from origin node $N_0$. For instance, after a first node of group $\hat{G}_1$ fully receives its respective subfile from origin node $N_0$, it may terminate its communication connection with origin node $N_0$ and replace such terminated communication connection with a communication connection to a node of group $G_1^1$ of secondary tree $M^1$, and the first node may then begin transferring its respective subfile that it received from origin node $N_0$ to the node of $G_1^1$. The nodes of group $G_1^1$ of secondary tree $M^1$ may each begin communicating the subfiles that they are receiving from the nodes of group $\hat{G}_1$ to at least one node of a second group $G_2^1$ before fully receiving their respective subfiles. That is, the nodes of group $G_1^1$ of secondary tree $M^1$ may forward their respective subfiles that they are receiving from the nodes of group $\hat{G}_1$ to the nodes of the next group of the secondary tree $M^1$, and so on, such that the file F is distributed through the replication groups of the secondary tree in much the same manner as distributed through the primary tree.

To achieve the best performance results, the values m and $m_1$ (i.e., the number, m, of groups included in each multicast tree versus the number, $m_1$, of multicast trees) should preferably be similar: this will lead to well-balanced multicast trees. Depending on the number of nodes, n, in the original replication set R, the example ALM-FastReplica algorithm may utilize only a primary multicast tree in certain situations and it may also employ secondary multicast trees in other situations. That is, depending on the number of nodes n to which file F is to be distributed, in certain situations it may be more efficient to utilize only a primary multicast tree, and in other situations it may be more efficient to further utilize secondary multicast trees for the distribution.

In operation, the example ALM-FastReplica algorithm of FIG. 4, first replicates file F via the primary multicast tree $\hat{M}$. Once groups $\hat{G}_1, \ldots, \hat{G}_m$ comprising the primary multicast tree $\hat{M}$, receive subfiles $F_1, \ldots, F_k$, they initiate (independently from each other) communication of subfiles $F_1, \ldots, F_k$ to the secondary multicast trees $M^1, \ldots, M^{m_1}$.

More specifically, the distribution of file F through the primary multicast tree $\hat{M}$ in accordance with an example embodiment of the ALM-FastReplica algorithm is as follows. Let groups $\hat{G}_1, \ldots, \hat{G}_m$ comprise the primary multicast tree $\hat{M}$, as shown in FIG. 4. Let $\hat{G}_i = \{N_1^i, \ldots, N_k^i\}, 1 \leq i \leq m$. The distribution within the primary multicast tree $\hat{M}$ of one embodiment comprises performing a distribution step and a collection step, as described below, and it may further comprise a group communication step, as also described below, if more than one replication group is included in the primary multicast tree.

In the distribution step of this example embodiment, originator node $N_0$ opens k concurrent network connections to nodes $N_1^1, \ldots, N_k^1$ of replication group $\hat{G}_1$, and starts sending subfile $F_i$ to the corresponding recipient node $N_i^1 1 \leq i \leq m$. This step is represented by box $\hat{G}_1$ (distr) in FIG. 4. In the collection step of this example embodiment, in group $\hat{G}_1$ each node $N_i^1$, after receiving the first bytes of file $F_i$, immediately starts sending the file $F_i$ to the rest of the nodes in group $\hat{G}_1$. This type of forwarding in which portions (e.g., packets) of file $F_i$ are immediately forwarded from the recipient node to other nodes of a replication group as soon as such portions are received by the recipient node (e.g., from the origin node) may be referred to herein as a "fast-forward" mode of distribution. In this collection step, each node in group $\hat{G}_1$ will be receiving all subfiles $F_1, \ldots, F_k$ of original file F. This step is represented by box $\hat{G}_1$ (coll) in FIG. 4. It should be understood that while the distribution and collection steps are shown in FIG. 4 as sequential boxes $\hat{G}_1$ (distr) and $\hat{G}_1$ (coll), as described above these operations are effectively performed concurrently.

Figure 5:
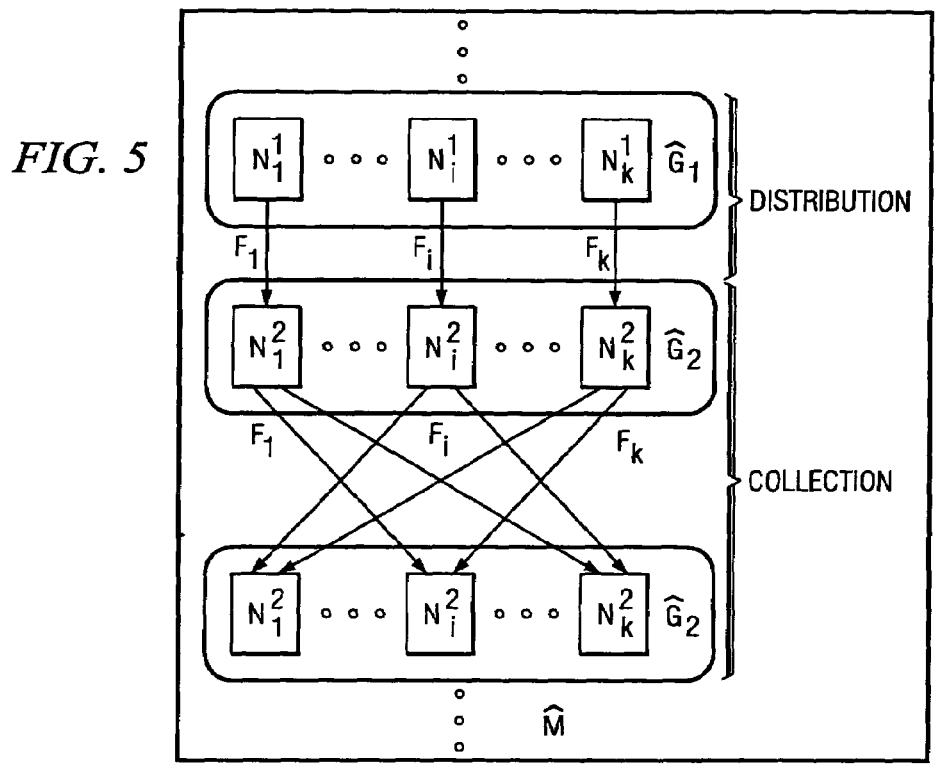
FIG. 5 shows an example communication pattern utilized between a first and second replication group of a primary multicast tree in accordance with the example embodiment of FIG. 4.

If, as in the example of FIG. 4, further replication groups exist in the primary multicast tree, then a group communication step is performed in this example embodiment. Thus, for instance, a first replication group, $\hat{G}_1$, distributes file F to a second replication group, $\hat{G}_2$, of the primary multicast tree $\hat{M}$. Communication between groups $\hat{G}_1$ and $\hat{G}_2$ follows a different file exchange protocol, defining another communication pattern actively used in this example embodiment of the ALM-FastReplica algorithm. The communication pattern utilized between groups $\hat{G}_1$ and $\hat{G}_2$ in accordance with this example embodiment is shown in FIG. 5. As shown in FIG. 5, each node $N_i^1$ of group $\hat{G}_1$, after receiving first bytes of subfile $F_i$, immediately starts sending the subfile $F_i$ to node $N_i^2$ of group $\hat{G}_2$. Thus, while the nodes of group $\hat{G}_1$ are performing the distribution and collection steps within such group, each node also concurrently establishes a communication connection to a node of group $\hat{G}_2$. Accordingly, not only does each node of group $\hat{G}_1$ forward the received portions of its respective subfile to the other nodes of group $\hat{G}_1$, but it also forwards the received portions of its respective subfile to a node of group $\hat{G}_2$. That is, before receiving the full subfile from the origin node, a recipient node of group $\hat{G}_1$ begins communicating such subfile to a corresponding node of group $\hat{G}_2$ (in a fast-forward mode of distribution). As shown in FIG. 5, such communication of subfiles from the nodes of group $\hat{G}_1$ to the nodes of group $\hat{G}_2$ is effectively a distribution step.

As further shown in FIG. 5, the nodes of group $\hat{G}_2$ may begin performing the collection step described above, wherein each node $N_1^2, N_2^2, \ldots, N_k^2$ of group $\hat{G}_2$ opens k−1 concurrent communication connections to the rest of the nodes of group $\hat{G}_2$ for transferring its respective subfile $F_i$ (i.e., the subfile that the node received from group $\hat{G}_1$). More specifically, each node of group $\hat{G}_2$ may begin distributing to the other nodes of group $\hat{G}_2$ its respective subfile that it is receiving from a node of group $\hat{G}_1$ before fully receiving such subfile. That is, the nodes of group $\hat{G}_2$ may use a fast-forward mode to perform the collection step concurrently with the distribution step of FIG. 5. In this way, each node of group $\hat{G}_2$ will be receiving all subfiles $F_1, \ldots, F_k$ of the original file F.

Similarly, group $\hat{G}_2$ may start communications with a next group $\hat{G}_3$ (not shown in FIG. 5) using the group communication step immediately after node $N_i^2$ receives the first bytes of file $F_i$. That is, each node $N_i^2$ of group $\hat{G}_2$, after receiving first bytes of subfile $F_i$, immediately starts sending the subfile $F_i$ to node $N_i^3$ of group $\hat{G}_3$. Thus, while the nodes of group $\hat{G}_2$ are performing the distribution and collection steps within such group, each node also concurrently establishes a communication connection to a node of group $\hat{G}_3$. Accordingly, not only does each node of group $\hat{G}_2$ forward the received portions of its respective subfile to the other nodes of group $\hat{G}_2$, but it also forwards the received portions of its respective subfile to a node of group $\hat{G}_3$. This replication procedure continues unrolling through the set of corresponding groups in primary multicast tree $\hat{M}$ shown in FIG. 4. Thus, the groups of the primary multicast tree $\hat{M}$ may before group communication in a fast-forward mode of distribution.

Figure 6:
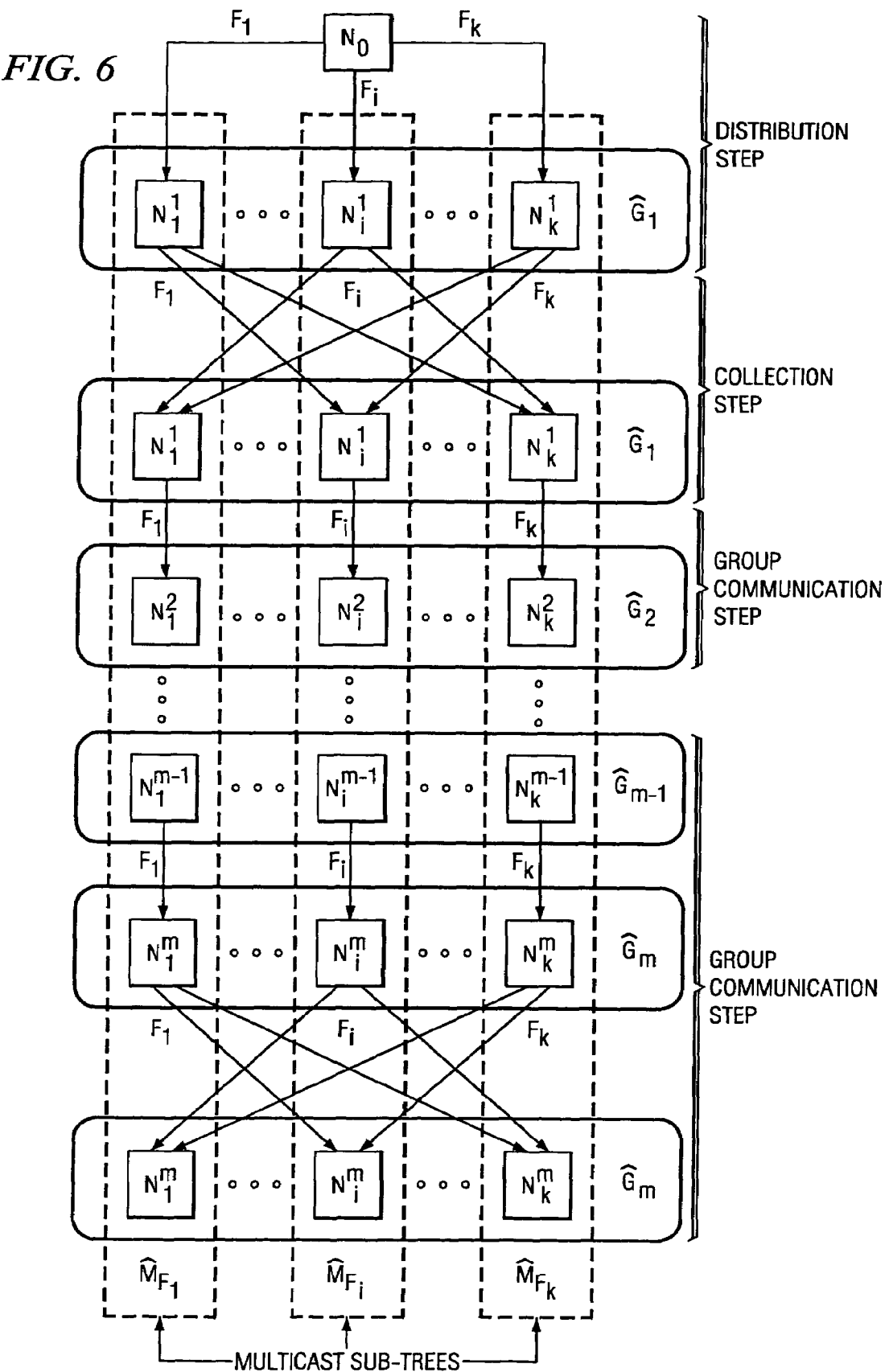
FIG. 6 shows an example of a fast-forward mode of distribution between replication groups of a primary multicast tree in accordance with the example embodiment of FIG. 4.

An example of such fast-forward distribution between replication groups of a primary multicast tree is shown further in FIG. 6. As shown, the primary multicast tree $\hat{M}$ is a collection of k multicast sub-trees $\hat{M}_{F_1}$, $\hat{M}_{F_2}$, ..., $\hat{M}_{F_k}$, where each such sub-tree $\hat{M}_{F_i}$ is replicating the corresponding subfile $F_i$. At the same time, nodes from these different multicast sub-trees use additional cross-connections between their nodes (as shown in FIG. 6) to exchange their complementary subfiles.

As shown in FIG. 4, in some implementations, secondary multicast trees may also be utilized for distribution, such as secondary multicast trees $M^1$, ..., $M^{m_1}$. Each replication group $\hat{G}_i (1 \leq i \leq m_1)$ of the primary multicast tree $\hat{M}$ may initiate the replication process of subfiles $F_1$, ..., $F_k$ to the next, secondary multicast tree $m_i = \{G_1^i, \ldots, G_m^i\}$ (see FIG. 4). Preferably, these transfers are asynchronous within the group $\hat{G}_i = \{N_1^i, \ldots, N_k^i\}$. When node $N_j^i$ receives the entire subfile $F_j$ in the primary multicast tree $\hat{M}$, it immediately starts transferring subfile $F_j$ to group $G_1^i$ of the secondary tree $M^i$ using the group communication step. For example, as shown in FIG. 4, once each node of group $\hat{G}_1$ of primary tree $\hat{M}$ receives its respective subfile from origin node $N_0$, such node of group $\hat{G}_1$ may terminate its communication connection with origin node $N_0$ and replace such communication connection with a connection to a corresponding node of group $G_1^1$ of secondary multicast tree $M^1$ for communicating its respective subfile that it received from origin node $N_0$ to the node of group $G_1^1$.

Figure 7:
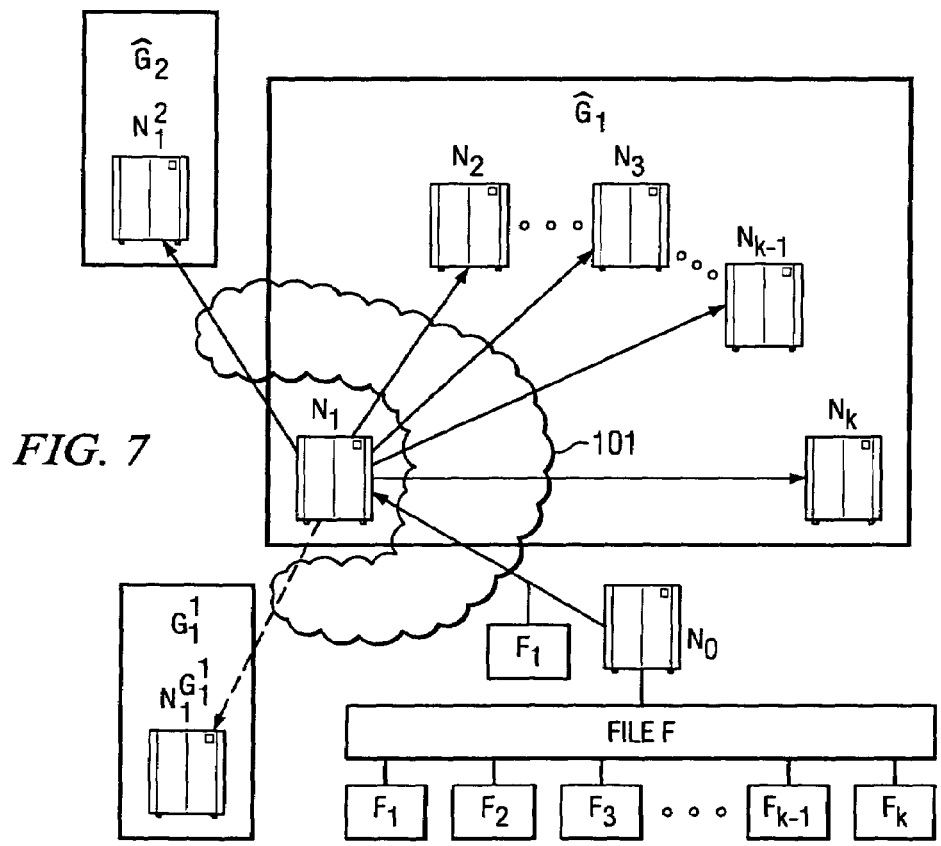
FIG. 7 shows the set of communication paths that may be concurrently utilized during the file distribution from an origin node $N_0$ to a first recipient node $N_1$ under a file distribution algorithm of one embodiment of the present invention.

FIG. 7 shows the set of communication paths that may be concurrently utilized during the file distribution from node $N_0$ to node $N_1$ under the ALM-FastReplica algorithm (with node $N_1$ shown as a representative of the recipient nodes). As explained above, during the distribution process, origin node $N_0$ communicates subfiles $F_1$, $F_2$, $F_3$, ..., $F_{k-1}$, $F_k$ to recipient nodes $N_1$, $N_2$, $N_3$, ..., $N_{k-1}$, $N_k$, respectively, via concurrent communication paths. As shown in FIG. 7, origin node $N_0$ has a communication connection to recipient node $N_1$ for communicating subfile $F_1$ thereto. And, in accordance with the collection process, node $N_1$ communicates subfile $F_1$ to the other recipient nodes $N_2$, $N_3$, ..., $N_{k-1}$, $N_k$ of replication group $\hat{G}_1$, respectively, via concurrent communication paths. Thus, node $N_1$ may begin communicating a portion of subfile $F_1$ to the other recipient nodes $N_2$, $N_3$, ..., $N_{k-1}$, $N_k$ of replication group $\hat{G}_1$ before node $N_1$ receives all of subfile $F_1$ from origin node $N_0$. For instance, node $N_1$ may communicate packets of subfile $F_1$ to the other recipient nodes $N_2$, $N_3$, ..., $N_{k-1}$, $N_k$ of replication group $\hat{G}_1$ as such packets of subfile $F_1$ are received by node $N_1$ from origin node $N_0$, rather than waiting for the receipt of all packets of subfile $F_1$ for commencing the communication to the other recipient nodes $N_2$, $N_3$, ..., $N_{k-1}$, $N_k$.

Of course, also in the collection step, node $N_1$ may simultaneously have k−1 concurrent communication paths established with recipient nodes $N_2$, $N_3$, ..., $N_{k-1}$, $N_k$ for receiving subfiles $F_2$, $F_3$, ..., $F_{k-1}$, $F_k$ from those recipient nodes (not shown in FIG. 7 for simplicity). For instance, each of the other recipient nodes $N_2$, $N_3$, ..., $N_{k-1}$, $N_k$ of replication group $\hat{G}_1$ may begin communicating a portion of their respective subfiles that they are receiving from origin node $N_0$ to node $N_1$ before the other recipient nodes receive all of their respective subfile from origin node $N_0$. For instance, node $N_2$ may communicate packets of subfile $F_2$ to the other recipient nodes $N_1$, $N_3$, ..., $N_{k-1}$, $N_k$ of replication group $\hat{G}_1$ as such packets of subfile $F_2$ are received by node $N_2$ from origin node $N_0$, rather than waiting for the receipt of all packets of subfile $F_2$ for commencing the communication to the other recipient nodes $N_1$, $N_3$, ..., $N_{k-1}$, $N_k$.

Accordingly, each of the recipient nodes $N_1$, $N_2$, $N_3$, ..., $N_{k-1}$, $N_k$ of replication group $\hat{G}_1$ may concurrently have a communication path established with origin node $N_0$ for receiving a corresponding one of subfiles $F_1$, $F_2$, $F_3$, ..., $F_{k-1}$, $F_k$ therefrom; each of the recipient nodes $N_1$, $N_2$, $N_3$, ..., $N_{k-1}$, $N_k$ of replication group $\hat{G}_1$ may have k−1 concurrent communication paths established with the other remaining recipient nodes for communicating its respective subfile that it receives from origin node $N_0$ to the remaining recipient nodes; and each of the recipient nodes $N_1$, $N_2$, $N_3$, ..., $N_{k-1}$, $N_k$ of replication group $\hat{G}_1$ may simultaneously have k−1 concurrent communication paths established with the other remaining recipient nodes for receiving subfiles from those remaining recipient nodes.

In certain embodiments, k corresponds to the maximum concurrent connections supportable by each recipient node $N_1$, ..., $N_k$. Further, if the total number n of recipient nodes to which file F is to be distributed is greater than k, then the nodes may be logically organized into a plurality of replication groups each having k nodes. In such case, after recipient node $N_1$ of group $\hat{G}_1$ receives its entire subfile $F_1$ from origin node $N_0$, the communication connection with node $N_0$ may be terminated and a connection with a recipient node of a different replication group may be established, such as with node $N_1^{G_1^1}$ of replication group $G_1^1$ shown in the example of FIG. 7. For instance, after each node $N_i$ of group $\hat{G}_1$ receives its entire subfile $F_i$ from origin node $N_0$, its communication connection with node $N_0$ may be terminated and a replaced with a connection with a corresponding recipient node of a different replication group, such as with node $N_i^{G_1^1}$ of replication group $G_1^1$ shown in the example of FIG. 7. The recipient nodes of such different replication group may follow a fast-forward mode of distributing among themselves their respective subfiles that they are receiving from the nodes of replication group $\hat{G}_1$.

In certain embodiments, k+1 corresponds to the maximum concurrent connections supportable by each recipient node $N_1$, ..., $N_k$. Further, if the total number n of recipient nodes to which file F is to be distributed is greater than k, then the nodes may be logically organized into a plurality of replication groups each having k nodes. As described above with FIG. 4, the plurality of replication groups may be logically organized into a primary multicast tree, and in certain embodiments the logical organization may further include secondary multicast tree(s). As an example of this embodiment, each recipient node of replication group $\hat{G}_1$ may establish a concurrent communication connection with a corresponding recipient node of a different replication group, such as with replication group $\hat{G}_2$ of FIG. 7 (see also FIG. 4) and begin communicating the subfile that it receives from origin node $N_0$ before such subfile is fully received from origin node $N_0$.

An example of this embodiment is shown for node $N_1$ in FIG. 5. As described above, recipient node $N_1$ of replication group $\hat{G}_1$ may concurrently have: 1) a communication path established with origin node $N_0$ for receiving subfile $F_1$ therefrom, 2) k−1 concurrent communication paths established with the other remaining recipient nodes $N_2$, $N_3$, ..., $N_{k-1}$, $N_k$ of group $\hat{G}_1$ for communicating its respective subfile $F_1$ that it receives from origin node $N_0$ to the remaining recipient nodes, and 3) k−1 concurrent communication paths established with the other remaining recipient nodes $N_2$, $N_3$, ..., $N_{k-1}$, $N_k$ for receiving the respective subfiles $F_1$, ..., $F_k$ from those remaining recipient nodes. Additionally, node $N_1$ may concurrently have a communication connection to a node of another replication group, such as node $N_1^2$ of group $\hat{G}_2$ in FIG. 7. Thus, node $N_1$ may begin communicating subfile $F_1$ to node $N_1^2$ of group $\hat{G}_2$ before node $N_1$ receives the full subfile $F_1$ from origin node $N_0$. As described above, group $\hat{G}_2$ may be referred to herein as being a group within a primary multicast tree, such as primary multicast tree $\hat{M}$ of FIG. 4. After node $N_1$ fully receives subfile $F_1$ from origin node N0, it may terminate its communication connection with origin node N0 and replace it with a communication connection to a node of another replication group, such as node $N_1^{G_1^1}$ of replication group $G_1^1$ shown in the example of FIG. 7. As described above, group $G_1^1$ may be referred to herein as being a group within a secondary multicast tree, such as within secondary multicast tree $M^1$ of FIG. 4.

In certain embodiments, k+2 corresponds to the maximum concurrent connections supportable by each recipient node $N_1, \ldots, N_k$. Further, if the total number n of recipient nodes to which file F is to be distributed is greater than k, then the nodes may be logically organized into a plurality of replication groups each having k nodes. In such case, each node of replication group $\hat{G}_1$ may establish a concurrent communication connection with each of the other recipient nodes of such replication group $\hat{G}_1$, as well as with a recipient node of each of two different replication groups of the primary multicast tree. For instance, in the example shown in FIG. 7 for node $N_1$, such recipient node $N_1$ of replication group $\hat{G}_1$ may concurrently have: 1) a communication path established with origin node $N_0$ for receiving subfile $F_1$ therefrom, 2) k–1 concurrent communication paths established with the other remaining recipient nodes $N_2, N_3, \ldots, N_{k-1}, N_k$ of group $\hat{G}_1$ for communicating its respective sub file $F_1$ that it receives from origin node $N_0$ to the remaining recipient nodes, and 3) k–1 concurrent communication paths established with the other remaining recipient nodes $N_2, N_3, \ldots, N_{k-1}, N_k$ for receiving the respective subfiles $F_1, \ldots, F_k$ from those remaining recipient nodes. Additionally, node $N_1$ may concurrently have a communication connection to a node of another replication group, such as node $N_1^2$ of group $\hat{G}_2$ in FIG. 7. Further, in this example embodiment, node $N_1$ may concurrently have a communication connection to a node of another replication group of the primary multicast tree (such other node not shown in FIG. 7). Thus, node $N_1$ may begin communicating subfile $F_1$ to node $N_1^2$ of group $\hat{G}_2$, as well as to the corresponding node of another replication group in the primary multicast tree, before node $N_1$ receives the full subfile $F_1$ from origin node $N_0$.

Figure 8:
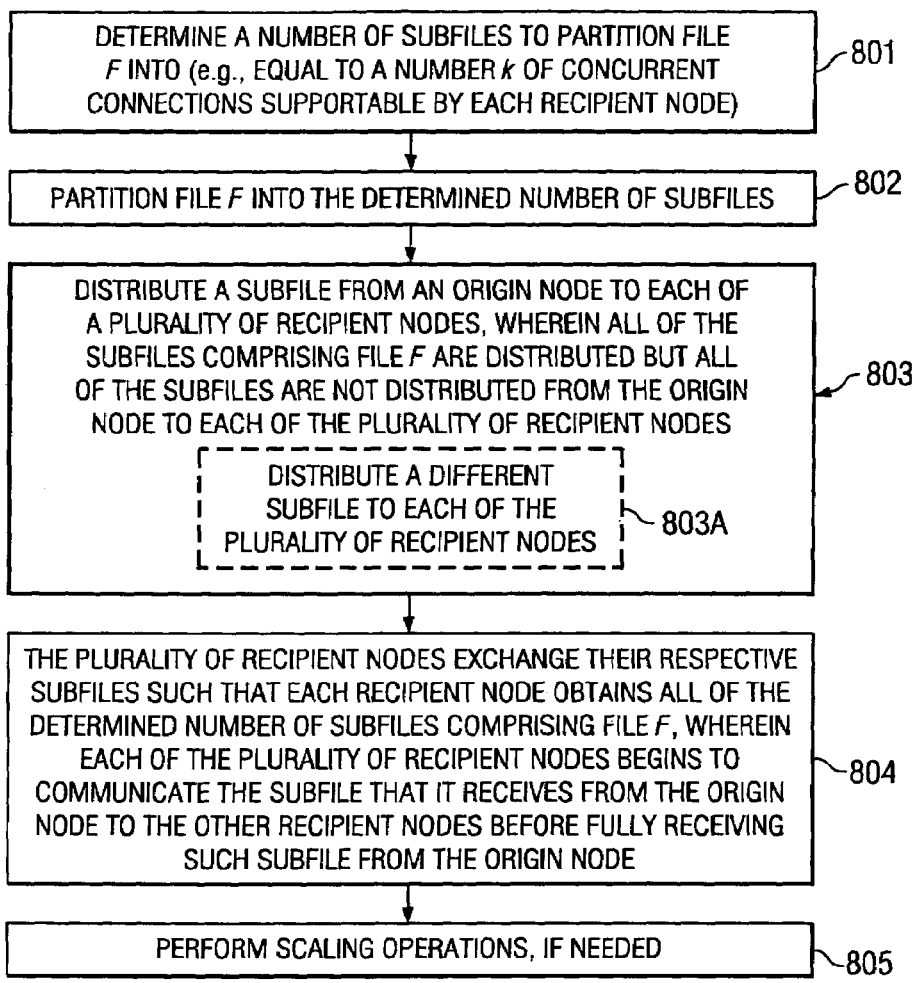
FIG. 8 shows an example operational flow diagram for distributing a file from an origin node to a plurality of recipient nodes in accordance with an embodiment of the present invention.

Turning now to FIG. 8, an example operational flow diagram for distributing a file from an origin node to a plurality of recipient nodes in accordance with one embodiment of the present invention is shown. In operational block 801, a number of subfiles into which file F is to be partitioned is determined. For instance, as shown in the example of FIGS. 1-3 above, in certain embodiments a ALM-FastReplica technique may be implemented in which file F may be partitioned into a number of subfiles corresponding to the number k of concurrent communication connections supportable by each recipient node. In operational block 802, file F is partitioned into the determined number of subfiles.

In operational block 803, a subfile is distributed from an origin node to each of a plurality of recipient nodes, wherein all of the subfiles comprising file F are distributed from the origin node. However, all of the subfiles are not distributed from the origin node to each of the plurality of recipient nodes. As shown, in certain embodiments block 803 may comprise operational block 803A, wherein a different subfile is distributed to each recipient node within the distribution group, as in the example of FIGS. 1-3 above in which the ALM-FastReplica technique is implemented. That is, each recipient node may receive a unique subfile from the origin node that is not received by any of the other recipient nodes within the distribution group.

In operational block 804, the plurality of recipient nodes exchange their respective subfiles such that each recipient node obtains all of the determined number of subfiles comprising file F. More specifically, as described above, each of the plurality of recipient nodes begins to communicate the subfile that it receives from the origin node to the other recipient nodes before fully receiving such subfile from the origin node.

In operational block 805, scaling operations may be performed, if needed. That is, if the number of recipient nodes is sufficiently large, the distribution process may be scaled to enable distribution to such a large number of recipient nodes. For instance, the distribution technique may be scaled to allow for a file distribution to hundreds, thousands, or tens of thousands, of recipient nodes, for example. More particularly, if it is determined that the number k of concurrent communication connections that can be supported by each of the nodes $N_0, \ldots, N_n$ is less than the total number n of recipient nodes n, then the distribution technique may be scaled for distribution to a plurality of groups of recipient nodes as described further below. Various suitable scaling techniques may be utilized. One scaling technique that may be utilized in certain embodiments comprises logically arranging the recipient nodes into a plurality of replication groups, and such replication groups may be logically organized into primary, and in some instances secondary, multicast trees, as described above with FIG. 4.

Figure 9A:
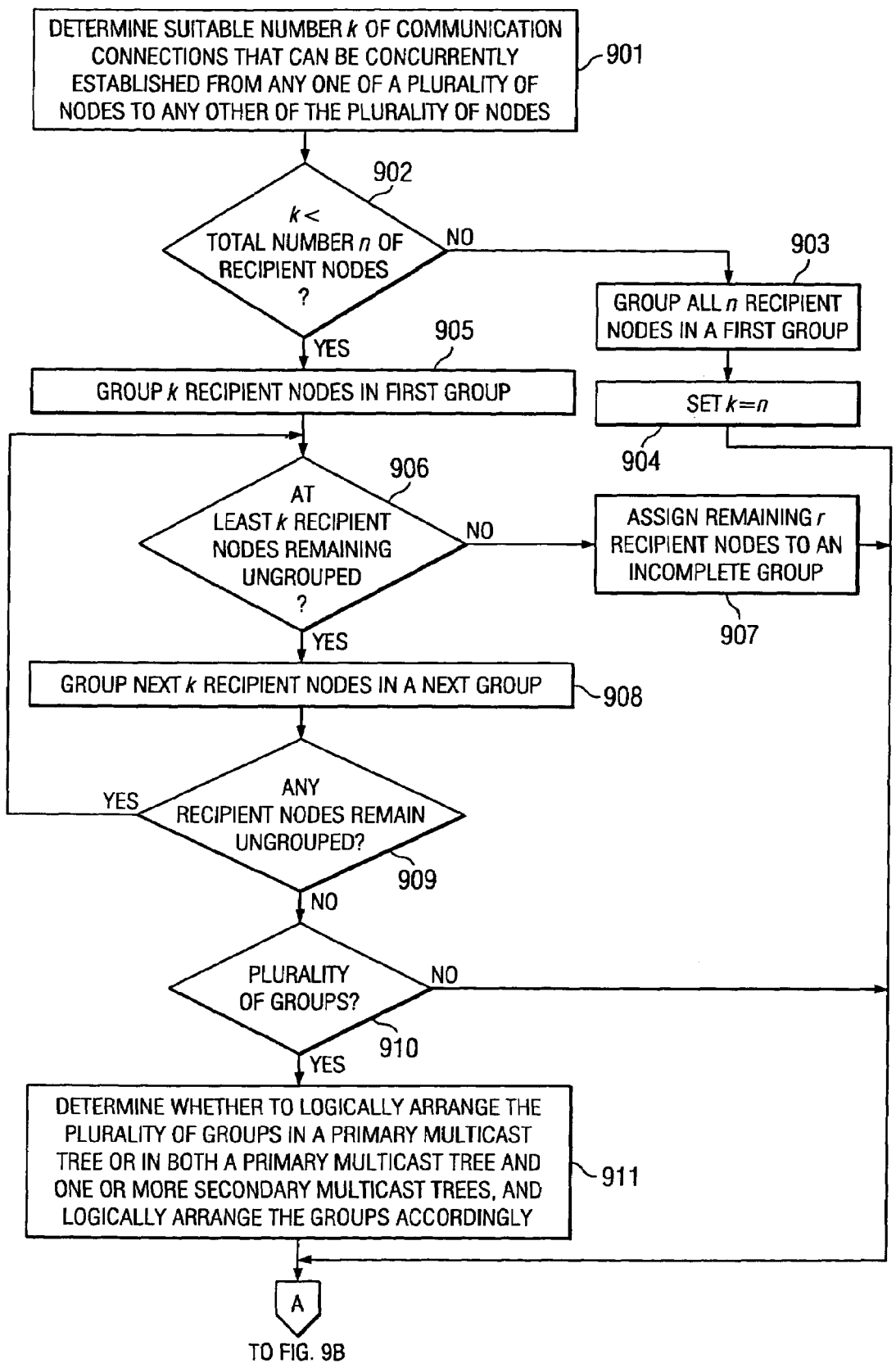
FIGS. 9A-9C show an example operational flow diagram for distributing a large file to a plurality of recipient nodes in a scalable fashion in accordance with one embodiment of the present invention.
Figure 9B:
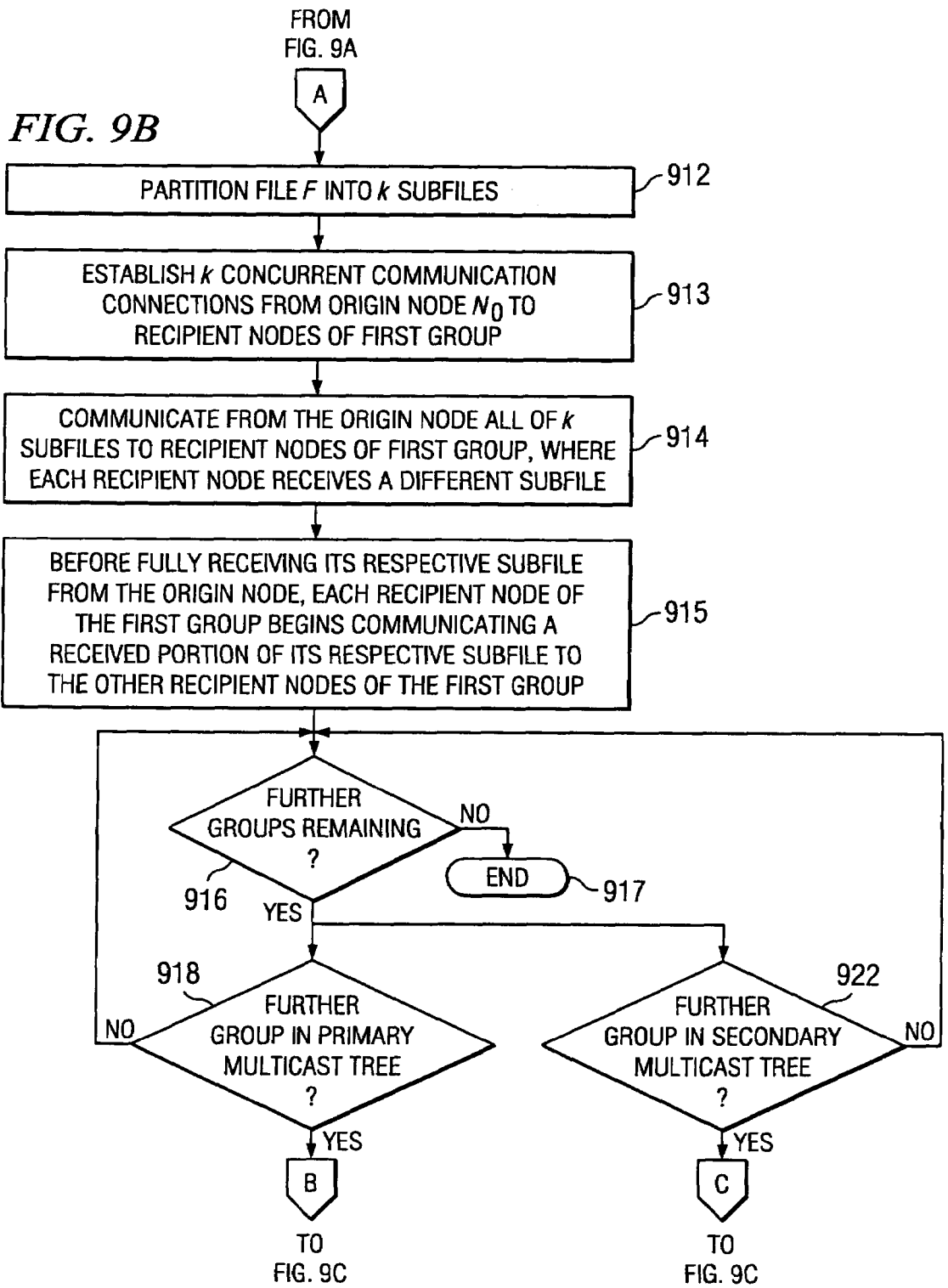
Figure 9C:
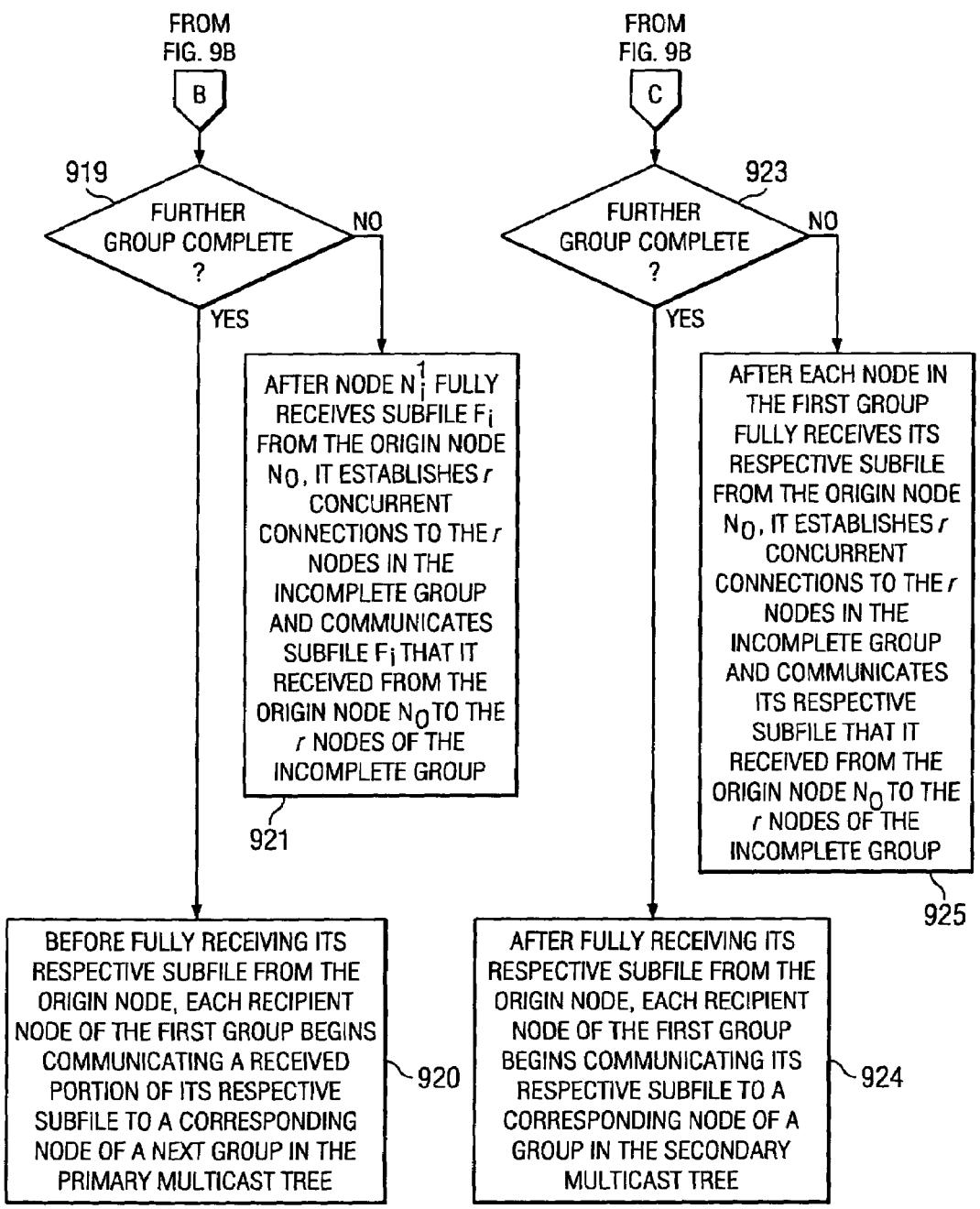

Turning to FIGS. 9A-9C, an example operational flow diagram for distributing a large file to a plurality of recipient nodes in a scalable fashion in accordance with one embodiment of the present invention is shown. As shown in FIG. 9A, operation of this example embodiment starts with operational block 901, whereat a suitable number k of communication connections that can be concurrently established from any one of a plurality of nodes $N_1, N_2, \ldots, N_n$ to which a file F is to be distributed to any other of the plurality of nodes is determined. In operational block 902 it is determined whether k is less than the total number n of recipient nodes to which file F is to be distributed. If k is not less than the total number n of recipient nodes, then operation advances to block 903 whereat all n of the recipient nodes are grouped into a first group of nodes. Then, in operational block 904, k is set equal to n. That is, the number of concurrent communication connections that is established from any one of the nodes during distribution is set to n. Operation then advances (via connector "A") from block 904 to operational block 912 shown in FIG. 9B, which is described further below.

If, at operational block 902, it is determined that k is less than the total number n of recipient nodes, then operation advances to block 905 whereat the first k number of recipient nodes $N_1, N_2, \ldots, N_n$ (i.e., nodes $N_1, N_2, \ldots, N_k$) are grouped into a first group of nodes (referred to as an initial group). Then, in operational block 906 it is determined whether at least k recipient nodes remain ungrouped. If there are fewer than k recipient nodes remaining to be grouped, then operation advances to block 907 whereat the remaining r recipient nodes (r<k) are grouped to an incomplete group. Operation then advances (via connector "A") from block 907 to operational block 912 shown in FIG. 9B, which is described further below.

If, at operational block 906, it is determined that at least k recipient nodes remain ungrouped, operation advances to block 908 whereat the next k number of recipient nodes are grouped into a next group. Then, in operational block 909, it is determined whether any recipient nodes remain ungrouped. If more recipient nodes do remain ungrouped, then operation returns to block 906 to continue the logical grouping of the recipient nodes. If it is determined at operational block 909 that no further recipient nodes remain ungrouped, then operation advances to block 910.

At operational block 910, it is determined whether the recipient nodes were grouped into a plurality of groups. If not, then operation advances (via connector "A") from block 910 to operational block 912 shown in FIG. 9B, which is described further below. If, on the other hand, the recipient nodes were grouped into a plurality of groups, operation advances from block 910 to block 911. At block 911, a determination is made as to whether to logically arrange the plurality of groups in a primary multicast tree or both a primary multicast tree and one or more secondary multicast trees, and the plurality of groups are logically arranged accordingly. Operation then advances (via connector "A") from block 911 to operational block 912 shown in FIG. 9B, which is described further below.

At operational block 912, of FIG. 9B, file F is partitioned into k subfiles. In operational block 913, origin node $N_0$ establishes k concurrent communication connections to the recipient nodes of the first group. Then, in operational block 914, origin node $N_0$ begins communicating all of the k subfiles to the recipient nodes of the first group, wherein each recipient node is receiving a different subfile (as in the distribution step of the above-described ALM-FastReplica distribution technique). In operational block 915, before fully receiving its respective subfile from the origin node, each recipient node of the first group begins communicating a received portion of its respective subfile to the other recipient nodes of the first group (as in the collection step of the above-described ALM-FastReplica distribution technique). Thus, even though block 914 and 915 are shown as sequential steps in FIG. 9B, the operations are effectively performed concurrently.

In operational block 916, it is determined whether further groups remain to have file F distributed thereto. If no such further groups remain, then operation ends in block 917. However, if further groups do remain, then operation continues to blocks 918 and 922 as described further below. In block 918, it is determined whether a further group exists in the primary multicast tree. If another group exists in the primary multicast tree, operation advances (via connector "B") to block 919 shown in FIG. 9C to determine whether the further group is a complete group. If it is a complete group, then operation advances to block 920 whereat, before fully receiving its respective subfile from the origin node, each recipient node of the first group begins communicating a received portion of its respective subfile to a corresponding node of a next group in the primary multicast tree. Thus, even though blocks 914-920 are shown as sequential steps in FIGS. 9B-9C, the operations are effectively performed concurrently.

If it is determined in block 919 that the further group in the primary multicast tree is an incomplete group (has less than k recipient nodes), operation advances to block 921 whereat each node of the first group, after fully receiving file F, opens r concurrent communication connections with the r nodes (r<k) of the next group and communicates its respective subfile that it received from the origin node. For instance, if the targeted number n of nodes for a file replication is not a multiple of k, i.e., $$\frac{n}{k} = m + r,$$

where r<k, then there is one "incomplete" group $G_{incomplete}$ with r nodes in it. In this example, if the further group in the primary multicast tree is an incomplete group, then the initial group of the primary multicast tree distributes file F to the incomplete group as shown in block 921. More specifically, in block 921, after node $N_i^1$ of the initial group has fully received subfile $F_i$, such node $N_i^1$ opens r concurrent network connections to all r nodes of the incomplete group for transferring subfile $F_i$ that it received from the origin node. In this way, at the end of this step, each node of the incomplete group has all subfiles $F_1, \ldots, F_k$ of original file F.

In block 922, it is determined whether a further group exists in a secondary multicast tree. If another group exists in a secondary multicast tree, operation advances (via connector "C") to block 923 shown in FIG. 9C to determine whether the further group is a complete group. If it is a complete group, then operation advances to block 924 whereat, after fully receiving its respective subfile from the origin node, each recipient node of the first group begins communicating its respective subfile to a corresponding node of a group in the secondary multicast tree. If it is determined in block 923 that the further group in the secondary multicast tree is an incomplete group (has less than k recipient nodes), operation advances to block 925 whereat each node of the first group, after fully receiving file F, opens r concurrent communication connections with the r nodes (r<k) of the next group and communicates its respective subfile that it received from the origin node. More specifically, in block 925, after all of the nodes in the first group have received all subfiles $F_1, \ldots, F_k$ comprising the entire original file F, each node $N_i^1$ of the first group opens r concurrent network connections to all r nodes of the incomplete group for transferring its respective subfile $F_i$ that it received from the origin node. In this way, at the end of this step, each node of the incomplete group has all subfiles $F_1, \ldots, F_k$ of original file F. As described above with FIGS. 4-7, operation may continue for distribution of file F to any number of groups arranged in primary and/or secondary multicast tree(s).

The above-described ALM-FastReplica distribution technique enables efficient distribution of a file F (and particularly a large file) to a plurality of recipient nodes. Consider the following performance analysis of the above-described ALM-FastReplica distribution technique. Below, we consider the following two performance metrics: average and maximum replication time. For illustration, the performance of the above-described ALM-FastReplica distribution technique is compared against two other types of distribution techniques. One type of distribution technique used in the below comparison, which is referred to herein as the "FR" technique, is a technique similar to the above-described ALM-FastReplica technique but does not use a "fast-forward" mode of distribution. That is, the example FR technique follows the distribution technique described above with FIGS. 1-3, but each recipient node begins communicating its respective subfile that it receives from the origin node to other recipient nodes of the replication group only after it has fully received the subfile from the origin node, rather than utilizing the fast-forward mode of distribution described above for the ALM-FastReplica technique. The second technique against which the ALM-FastReplica algorithm is compared is a traditional Multiple Unicast distribution technique. More specifically, let Multiple Unicast denote a traditional file distribution schema that transfers the entire file F from the origin node $N_0$ to nodes $N_1, \ldots, N_n$ by simultaneously using n concurrent network connections.

To demonstrate performance benefits of the above-described ALM-FastReplica distribution technique, consider a case with 1000 replication nodes, where each node can open k=10 concurrent connections, i.e. there are 100 groups, each having k=10 nodes. The FR algorithm, described briefly above, works iteratively. More specifically, file F is divided in k=10 equal subsequent subfiles, and first, the FR technique is used to replicate file F to a first group of 10 nodes. As mentioned above, with the FR technique, the recipient nodes of the first group each fully receive their respective subfile from the origin node before beginning to communicate their respective subfile to the other recipient nodes of the first group. Once they receive all the subfiles comprising file F, the FR technique uses these 10 nodes to act as origin nodes with file F to each repeat the same FR procedure again (i.e., each of the 10 nodes of the first group will act as an origin node to each distribute file F to another group—thus, in a second iteration of the FR algorithm, the recipient nodes of the first group distribute file F to 10 other groups having 10 nodes each). Accordingly, in three algorithm iterations (10×10×10), the file F can be replicated among 1000 nodes. Each iteration of the FR algorithm has 2 separate steps (distribution and collection), each used for transferring the $$\frac{1}{10}-th$$

portion of the original file F.

Multiple Unicast is a schema that also works iteratively. First, it transfers the entire file F from the origin node to each node of a first group of 10 nodes by simultaneously opening k=10 concurrent network connections. Then, it uses these 10 nodes (when they receive the entire file F) as the origin nodes and repeats the same procedure to the new groups of nodes, etc. The ALM-FastReplica algorithm operates as described above, using a primary multicast tree having 10 replication groups, and 9 secondary multicast trees each also having 10 replication groups.

Let BW denote a bandwidth matrix, where BW[i][j] reflects the available bandwidth of the communication path from node $N_i$ to node $N_j$ in the replication set as measured at some time T, and let Var (or "bandwidth variance") be the ratio of maximum to minimum available bandwidth along the communication paths participating in the file distribution. For the below analysis, suppose the bandwidth matrix BW is populated in the following way:

BW[i][j]=B×random(1, Var), where function random(1, Var) returns a random integer var: $1 \leq var \leq Var$.

While this provides a relatively simplistic model, it helps to reflect a realistic situation, where the available bandwidth of different links can be significantly different. This model is referred to herein as a uniform-random model. To perform a sensitivity analysis of how the above-described ALM-FastReplica performance depends on a bandwidth variance of participating paths, a range of different values for Var between 1 and 10 have been used in my initial experiments. When Var=1, it is an idealistic setting, wherein all of the communication paths are homogeneous and have the same bandwidth B (i.e., no variance in bandwidth). When Var=10, the network paths between the nodes have highly variable available bandwidth with a possible difference of up to 10 times.

Figure 10:
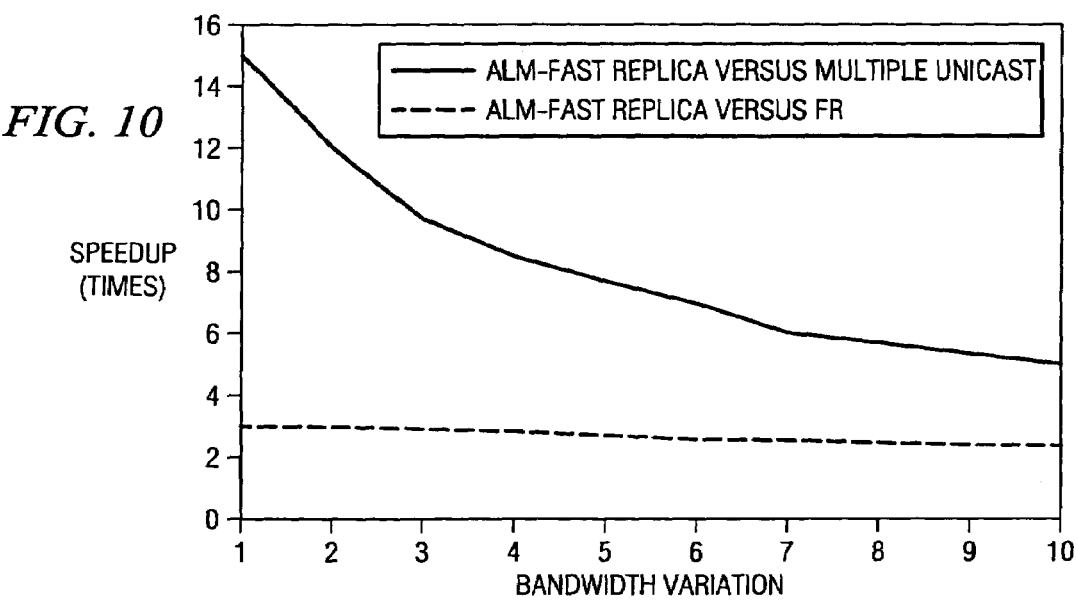
FIG. 10 shows a graph illustrating a relative speedup of average file replication time for an example file distribution technique of an embodiment of the present invention, referred to herein as ALM-FastReplica, versus other distribution techniques.

Using the uniform-random model and its bandwidth matrix BW, the average and maximum file replication times are computed under ALM-FastReplica, FR, and Multiple Unicast methods for 1000 nodes in the replication set, and the relative speedup of the file replication time under ALM-FastReplica is compared to the replication time under the FR and Multiple Unicast distribution strategies. Relative speedup of average file replication time for the above example is shown in the graph of FIG. 10. That is, FIG. 10 shows a graph illustrating a relative speedup of average file replication time for 1) ALM-FastReplica versus Multiple Unicast and 2) ALM-FastReplica versus FR for the above example.

For Var=1, there is no variation in bandwidth, i.e., all the communication paths used for the file distribution have the same bandwidth B. Under this idealistic setting, ALM-FastReplica outperforms the FR technique by three times, and ALM-FastReplica outperforms Multiple Unicast by fifteen (15) times, as shown in the graph of FIG. 10. This improvement can be explained as follows. The ALM-FastReplica replication process has two steps: 1) primary multicast tree and 2) secondary multicast trees, each used for transferring the $$\frac{1}{10}-th$$

portion (subfile) of the original file F. The FR replication process has three iterations. In each iteration, the replication process follows the above-described FR process, i.e., each iteration has 2 separate steps (distribution and collection), each used for transferring the $$\frac{1}{10}-th$$

portion (subfile) of the original file F. Thus, overall FR technique performs 6 steps, each used for transferring the $$\frac{1}{10}-th$$

portion of the original file F. Finally, the Multiple Unicast replication process has three iterations, each used for transferring the entire file F.

While the performance benefits of ALM-FastReplica, are decreasing for higher variation of bandwidth of participating paths, as shown in FIG. 10, it still remains very efficient, outperforming FR by more than two times and Multiple Unicast by more than five times in average replication time when Var=10. Further, the maximum replication time under ALM-FastReplica is three times better than under the FR technique, and fifteen times better than under Multiple Unicast, independent of the values of bandwidth variation (intuitively, these are improvements of the worst path in the uniform-random model, and the reasonings are similar to those described for the idealistic setting).

As one example application of embodiments of the present invention, consider the distribution of streaming media files within a CDN. In order to improve streaming media quality, the latest work in this direction proposes to stream video from multiple edge servers (or mirror sites), and in particular, by combining the benefits of multiple description coding (MDC) with Internet path diversity. MDC codes a media stream into multiple complementary descriptions. These descriptions have the property that if either description is received it can be used to decode the baseline quality video, and multiple descriptions can be used to decode improved quality video.

Thus, for a media file encoded with MDC, different descriptions can be treated as subfiles, and a distribution technique, such as the above-described ALM-FastReplica technique, can be applied to replicate them. That is, while the above examples describe partitioning a file into sub files based, for example, on the number k of concurrent communication connections that can be supported by a node, in certain embodiments the distribution technique may be utilized with a file F encoded with multiple descriptions, wherein each of the multiple descriptions may be distributed to recipient nodes in the manner in which the above-described subfiles of a file F are described as being distributed.

Taking into account the nature of MDC (i.e., that either description received by the recipient node can be used to decode the baseline quality video), the reliability of the ALM-FastReplica algorithm may be improved. For instance, when using primary and secondary multicast trees as described above in FIG. 4 for distributing a media file encoded with MDC, even if failed nodes exist in the primary and/or secondary multicast trees, this ALM-FastReplica technique may provide a suitable distribution technique because receipt by nodes below the failed node(s) in the distribution tree of a portion of the descriptions (from the working nodes of the higher level) will be enough to decode the good quality video.

Various elements for performing the above-described file distribution functions of embodiments of the present invention may be implemented in software, hardware, firmware, or a combination thereof. For example, software may be used on an origin node $N_O$ for determining logical groupings of recipient nodes and/or for partitioning file F into the appropriate number of subfiles. As another example, network interfaces may be used to concurrently communicate subfiles from an origin node to recipient nodes of a distribution group (e.g., in the distribution step of ALM-FastReplica), as well as for communication of such subfiles between recipient nodes of the distribution group (e.g., in the collection step of ALM-FastReplica).

When implemented via computer-executable instructions, various elements of embodiments of the present invention for distributing file F from an origin node to recipient nodes are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

What is claimed is:

1. A method comprising:
   partitioning a file into a plurality of subfiles;
   distributing the plurality of subfiles from a first node to a first group comprising a plurality of recipient nodes, wherein at least one subfile is distributed from the first node to each recipient node of said first group but no individual recipient node receives all of said plurality of subfiles; and
   exchanging subfiles among said plurality of recipient nodes of said first group such that each recipient node of said first group obtains all of said plurality of subfiles, wherein at least one recipient node of said first group begins communicating a portion of its respective subfile that it is receiving from the first node to at least one other recipient node of said first group before the at least one recipient node fully receives its respective subfile.

2. The method of claim 1 wherein said distributing comprising:
   distributing from the first node a different subfile to each of said recipient nodes of said first group.

3. The method of claim 1 wherein said partitioning comprises:
   partitioning said file into said plurality of subfiles corresponding in number to a number of said recipient nodes in said first group.

4. The method of claim 1 wherein said partitioning further comprises:
   partitioning said file into said plurality of subfiles that are each approximately equal in size.

5. The method of claim 1 further comprising:
   determining a number of said recipient nodes to include in said first group.

6. The method of claim 5 wherein said determining comprises:
   determining a suitable number of concurrent communication connections that can be used for communication of information between one of the nodes and a plurality of the other nodes; and
   determining said number of recipient nodes to include in said first group as corresponding in number to said number of concurrent communication connections.

7. The method of claim 1 wherein said distributing comprises:
   distributing the plurality of subfiles to said plurality of recipient nodes of said first group concurrently.

8. The method of claim 1 wherein exchanging subfiles among said plurality of recipient nodes of said first group further comprises:
   each of said plurality of recipient nodes establishing concurrent communication connections to every other recipient node of said first group.

9. The method of claim 1 wherein said first node and said plurality of recipient nodes of said first group each comprise a server computer.

10. The method of claim 9 wherein said first node and said plurality of recipient nodes are distributed server computers in a Content Distribution Network (CDN).

11. The method of claim 1 further comprising:
    said first group of recipient nodes communicating said file to a second group comprising a plurality of recipient nodes.

12. The method of claim 11 further comprising:
    each recipient node of said first group communicating a subfile to every recipient node of said second group such that said recipient nodes of said second group each receive all of said plurality of subfiles.

13. The method of claim 11 further comprising:
    each recipient node of said first group communicating the subfile that it receives from said first node to at least one node of the second group.

14. The method of claim 13 wherein each recipient node of said first group begins communicating the subfile that it is receiving from said first node to said at least one node of the second group before fully receiving the subfile from the first node.

15. The method of claim 1 further comprising:
logically organizing a plurality of groups of recipient nodes into a primary multicast tree, wherein the groups of the primary multicast tree are logically organized sequentially such that intermediate groups of the primary multicast tree each communicate the file to a next sequential group of the primary multicast tree and wherein each intermediate group begins to communicate the file to a next sequential group of the primary multicast tree before fully receiving the file from a preceding group of the primary multicast tree.

16. The method of claim 15 further comprising:
further logically organizing a plurality of groups of recipient nodes into a secondary multicast tree, wherein at least one group of the primary multicast tree begins communicating the file to at least one group of the secondary multicast tree after the group of the primary multicast tree has fully received the file.

17. A system comprising:
means for partitioning a file into a plurality of subfiles;
an origin node comprising means for distributing all of said plurality of subfiles from said origin node to a first group comprising a plurality of recipient nodes, wherein at least one subfile is distributed from the origin node to each recipient node of said first group but not all of said plurality of subfiles are distributed from the origin node to any of the recipient nodes of said first group; and
said recipient nodes of said first group each comprising means for exchanging their respective subfiles received from said origin node such that each recipient node of said first group obtains all of said plurality of subfiles, wherein said means for exchanging of at least one recipient node of said first group begins communicating a portion of its respective subfile that it is receiving from the first node to at least one other recipient node of said first group before the at least one recipient node fully receives its respective subfile from the origin node.

18. The system of claim 17 wherein said means for distributing comprises:
means for distributing from the origin node a different subfile to each of said recipient nodes of said first group.

19. The system of claim 17 wherein said means for partitioning comprises:
means for partitioning said file into said plurality of subfiles corresponding in number to a number of said recipient nodes in said first group.

20. The system of claim 17 wherein said means for distributing comprises:
means for distributing the plurality of subfiles to said plurality of recipient nodes of said first group concurrently.

21. The system of claim 17 wherein each of said recipient nodes of said first group further comprises:
means for communicating said file to a second group comprising a plurality of recipient nodes.

22. The system of claim 21 wherein said means for communicating of each recipient node of said first group begins communicating the subfile that such recipient node is receiving from said origin node to at least one node of the second group before fully receiving the subfile from the origin node.

23. A system comprising:
an origin node operable to partition a file into a plurality of subfiles, wherein said plurality of subfiles correspond in number to a number of recipient nodes in a first group to which said file is to be distributed;
said origin node operable to distribute all of said plurality of subfiles to said recipient nodes, wherein a different subfile is distributed from said origin node to each of said recipient nodes; and
said recipient nodes operable to exchange their respective subfiles received from said origin node such that each recipient node obtains all of said plurality of subfiles, wherein at least one recipient node is operable to begin communicating a portion of its respective subfile that it is receiving from the origin node to at least one other recipient node before the at least one recipient node fully receives its respective subfile from the origin node.

24. The system of claim 23 wherein the origin node is operable to distribute the plurality of subfiles to said number of recipient nodes of said first group concurrently.

25. A method comprising:
distributing a plurality of subfiles that comprise a file from a first node to a first group comprising a plurality of recipient nodes, wherein at least one subfile distributed from the first node to each recipient node of said first group but no individual recipient node of said first group receives all of said plurality of subfiles from the first node; and
exchanging subfiles among said plurality of recipient nodes of said first group such that each recipient node of said first group obtains all of said plurality of subfiles, wherein at least one recipient node of said first group begins communicating a portion of its respective subfile that it is receiving from the first node to at least one other recipient node of said first group before the at least one recipient node fully receives its respective subfile.

26. The method of claim 25 further comprising:
partitioning said file into said plurality of subfiles.

27. The method of claim 25 wherein said distributing comprising:
distributing from the first node a different subfile to each of said recipient nodes of said first group.

28. The method of claim 25 wherein said distributing comprises:
distributing the plurality of subfiles to said plurality of recipient nodes of said first group concurrently.

29. The method of claim 25 wherein exchanging subfiles among said plurality of recipient nodes of said first group further comprises:
each of said plurality of recipient nodes establishing concurrent communication connections to every other recipient node of said first group.

30. The method of claim 25 further comprising:
said first group of recipient nodes communicating said file to a second group comprising a plurality of recipient nodes.

31. The method of claim 30 wherein each recipient node of said first group begins communicating the subfile that it is receiving from said first node to at least one node of the second group before fully receiving the subfile from the first node.

32. A method comprising:

distributing a plurality of descriptors of a file encoded with multiple description coding (MDC) from a first node to a first group comprising a plurality of recipient nodes, wherein at least one descriptor is distributed from the first node to each recipient node of said first group but not all of said plurality of descriptors are distributed from the first node to any of the recipient nodes of said first group; and said plurality of recipient nodes of said first group exchanging their respective descriptors such that each recipient node of said first group obtains all of said plurality of descriptors, wherein at least one recipient node of said first group begins communicating a portion of its respective descriptor that it is receiving from the first node to at least one other recipient node of said first group before the at least one recipient node fully receives its respective descriptor from the first node.

33. The method of claim 32 wherein said distributing comprising:

distributing from the first node a different descriptor to each of said recipient nodes of said first group.

34. The method of claim 32 wherein said distributing comprises:

distributing the plurality of descriptors to said plurality of recipient nodes of said first group concurrently.

* * * * *

UNITED STATES PATENT AND TRADEMARK OFFICE
CERTIFICATE OF CORRECTION

PATENT NO. : 7,349,906 B2 Page 1 of 1
APPLICATION NO. : 10/619805
DATED : March 25, 2008
INVENTOR(S) : Ludmila Cherkasova It is certified that error appears in the above-identified patent and that said Letters Patent is hereby corrected as shown below:

In column 10, line 53, delete "filly" and insert -- fully --, therefor.

Signed and Sealed this

Fifth Day of August, 2008

JON W. DUDAS
*Director of the United States Patent and Trademark Office*